United States Patent [19]
Tanaka et al.

[11] Patent Number: 5,796,352
[45] Date of Patent: *Aug. 18, 1998

[54] AUDIO VIDEO EQUIPMENT SYSTEM WITH BUS LINE AND METHOD OF ESTABLISHING A CONNECTION SETTING FOR THE AUDIO VIDEO EQUIPMENT SYSTEM

[75] Inventors: Shigeo Tanaka, Tokyo; Hiroshi Yamazaki; Koichi Sugiyama, both of Kanagawa; Makoto Sato, Kanagwa; Noriko Kotabe, Chiba; Akira Katsuyama; Yoshio Osakabe, both of Kanagawa; Yasuo Kusagaya, Tokyo, all of Japan

[73] Assignee: Sony Corporation, Tokyo, Japan

[*] Notice: The term of this patent shall not extend beyond the expiration date of Pat. No. 5,550,979.

[21] Appl. No.: 516,121

[22] Filed: Aug. 17, 1995

Related U.S. Application Data

[63] Continuation of Ser. No. 165,166, Dec. 10, 1993, abandoned.

[30] Foreign Application Priority Data

Dec. 28, 1992 [JP] Japan ................................. 4-361413

[51] Int. Cl.$^6$ .......................... G06F 13/00; G05B 23/02; G05B 19/04; H04Q 9/00
[52] U.S. Cl. .............................. 340/825.24; 340/825.25; 340/825.22; 340/825.06; 340/825.52; 395/200.05; 364/132; 364/230.4
[58] Field of Search .................... 340/825.24, 825.25, 340/825.22, 825.06, 825.15, 825.37, 825.52; 395/200.05; 364/132, 230.4

[56] References Cited

U.S. PATENT DOCUMENTS

| | | |
|---|---|---|
| 4,855,730 | 8/1989 | Venners et al. .................. 340/825.24 |
| 5,142,277 | 8/1992 | Yarberry et al. ................. 340/825.06 |
| 5,182,552 | 1/1993 | Paynting ......................... 340/825.25 |
| 5,255,180 | 10/1993 | Shinoda et al. ............... 340/825.24 X |
| 5,280,281 | 1/1994 | Shimotsuma et al. ............ 340/825.24 |
| 5,351,041 | 9/1994 | Ikata et al. ..................... 340/825.24 |
| 5,420,573 | 5/1995 | Tanaka et al. .................... 340/825.24 |
| 5,457,446 | 10/1995 | Yamamoto ....................... 340/825.24 |
| 5,537,104 | 7/1996 | Van Dort et al. .................. 340/825.22 |
| 5,550,979 | 8/1996 | Tanaka et al. ............... 340/825.24 X |

FOREIGN PATENT DOCUMENTS

| | | |
|---|---|---|
| 0510739 | 10/1992 | European Pat. Off. . |
| 0511794 | 11/1992 | European Pat. Off. . |
| A63-157202 | 11/1988 | Japan . |
| A63-157203 | 11/1988 | Japan . |
| A04167640 | 9/1992 | Japan . |
| WOA9115920 | 4/1991 | WIPO . |

OTHER PUBLICATIONS

Kawata et al., "Digital LSI: The Key to Refining the Automotive Audio System," pp. 101–102.

Mitchell et al.,"Low Cost Multiple Access Networks Realized by High Performance Microcontroller," p. 2.

Primary Examiner—Michael Horabik
Assistant Examiner—William H. Wilson, Jr.
Attorney, Agent, or Firm—Jay H. Maioli

[57] ABSTRACT

An audio video (AV) equipment system with a bus line including read-only-memory (ROM) that stores a plurality of predetermined system configurations of AV component devices. The system includes a bus line, a main controller an auxiliary controller, a memory, a display, a selector, and a clock. A SIP (system information pointer) memory temporarily stores a SIP which indicates any of the system configurations stored in the ROM. The SIP is finally stored in a non-volatile memory that retains data after removal of electric power.

18 Claims, 38 Drawing Sheets

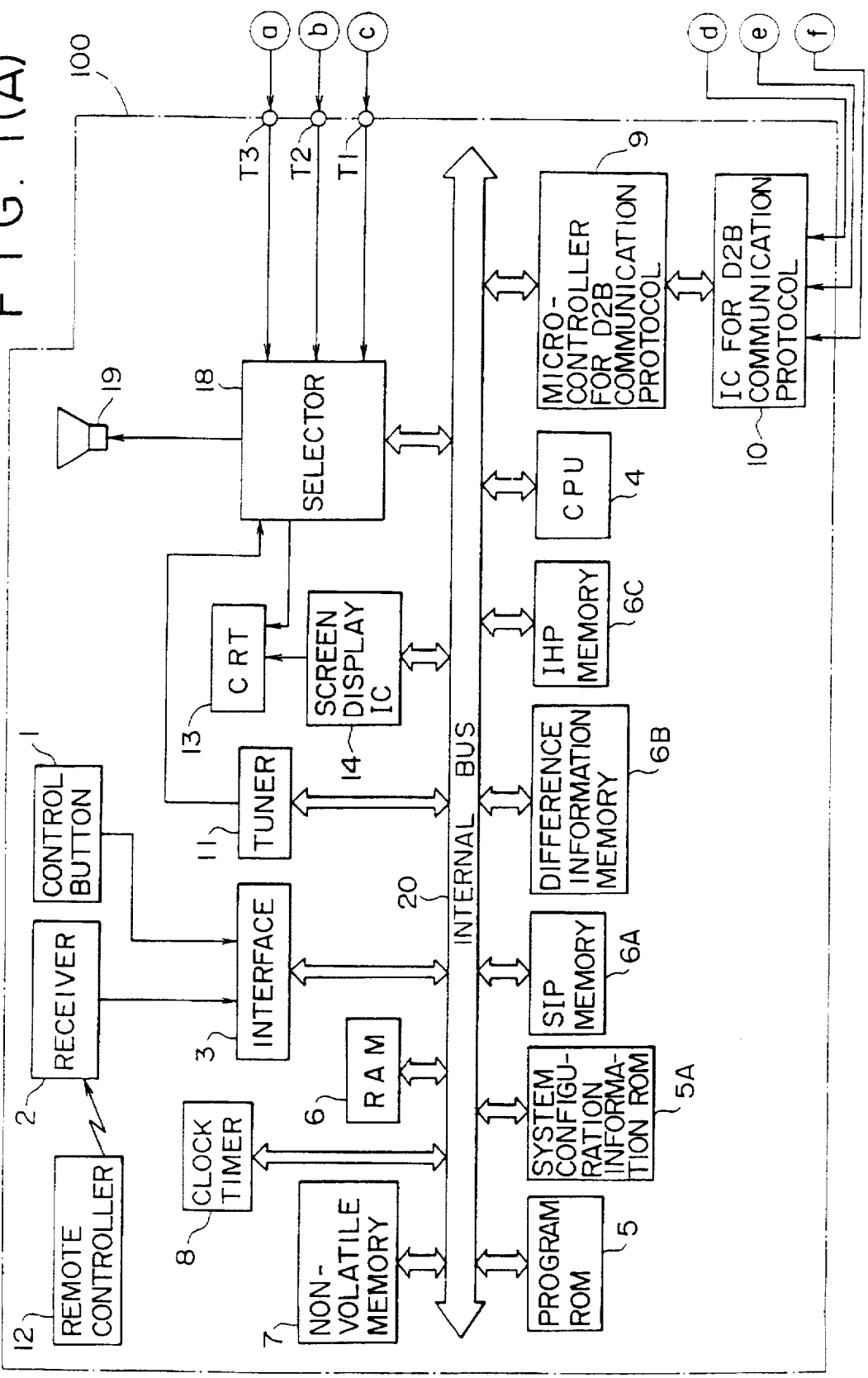

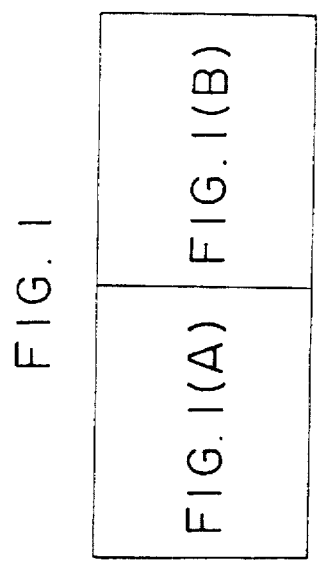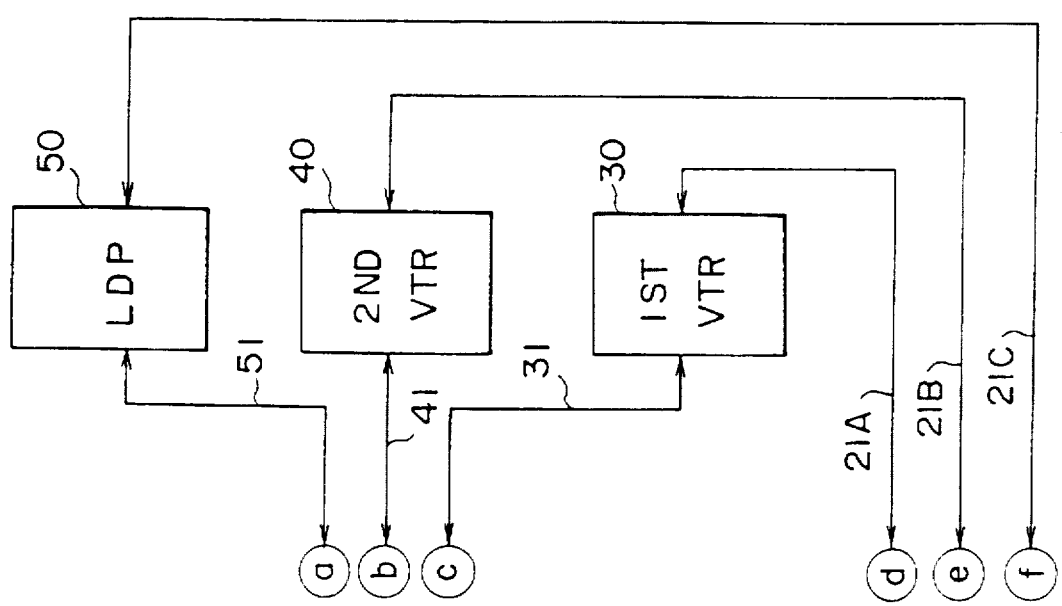

FIG. 2

```
PLNO   PLNO NM ADR  SIG
-----------------------------------------------
1-I/O---1-VTR1 120H COMPOSITE VIDEO→BS AUDIO
2-I/O---1-VTR2 121H
3-I-----1-LDP  130H
```

NM:NAME
(DEVICE NAME)
PLON:
AV PLUG No.
I/O: INPUT/OUTPUT
ADR: ADDRESS
SIG: CONTENTS

FIG. 3

```
PLNO   PLNO NM ADR  SIG            (EXTNP)  (PLNO)(NM) (ADR)(SIG)
-------------------------------------------------------------------
1-I/O---1-VTR1 120H CVBS/A-AUDIO ( 2-I/O----1--VTR3 122H CV/AU)
2-I/O---1-VTR2 121H
3-I-----1-LDP  130H
4-(POINTER TO EXT-AUXILIARY AV CENTER INFORMATION TABLE)
```

FIG. 4

```
PLNO   PLNO NM ADR  SIG            (EXTNP)  (PLNO)(NM) (ADR)(SIG)
-------------------------------------------------------------------
1-I/O---1-VTR1 120H CVBS/A-AUDIO ( 2-I/O----1--VTR3 122H CV/AU)
2-I/O---1-VTR2 121H                          (POINTER TO LOWER-LAYER SIP)
3-I-----1-LDP  130H
4-(POINTER TO EXT-AUXILIARY AV CENTER INFORMATION TABLE)
```

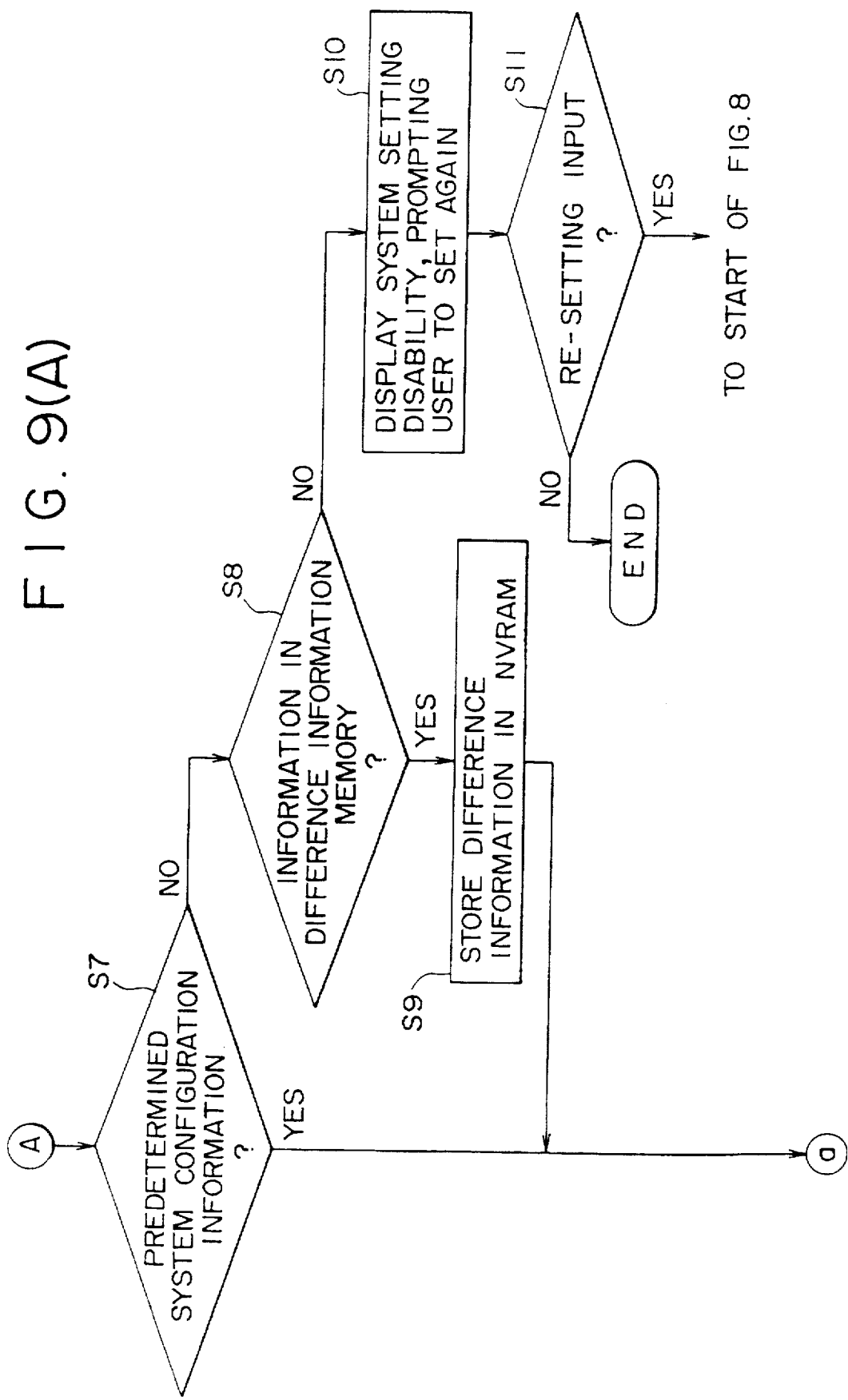

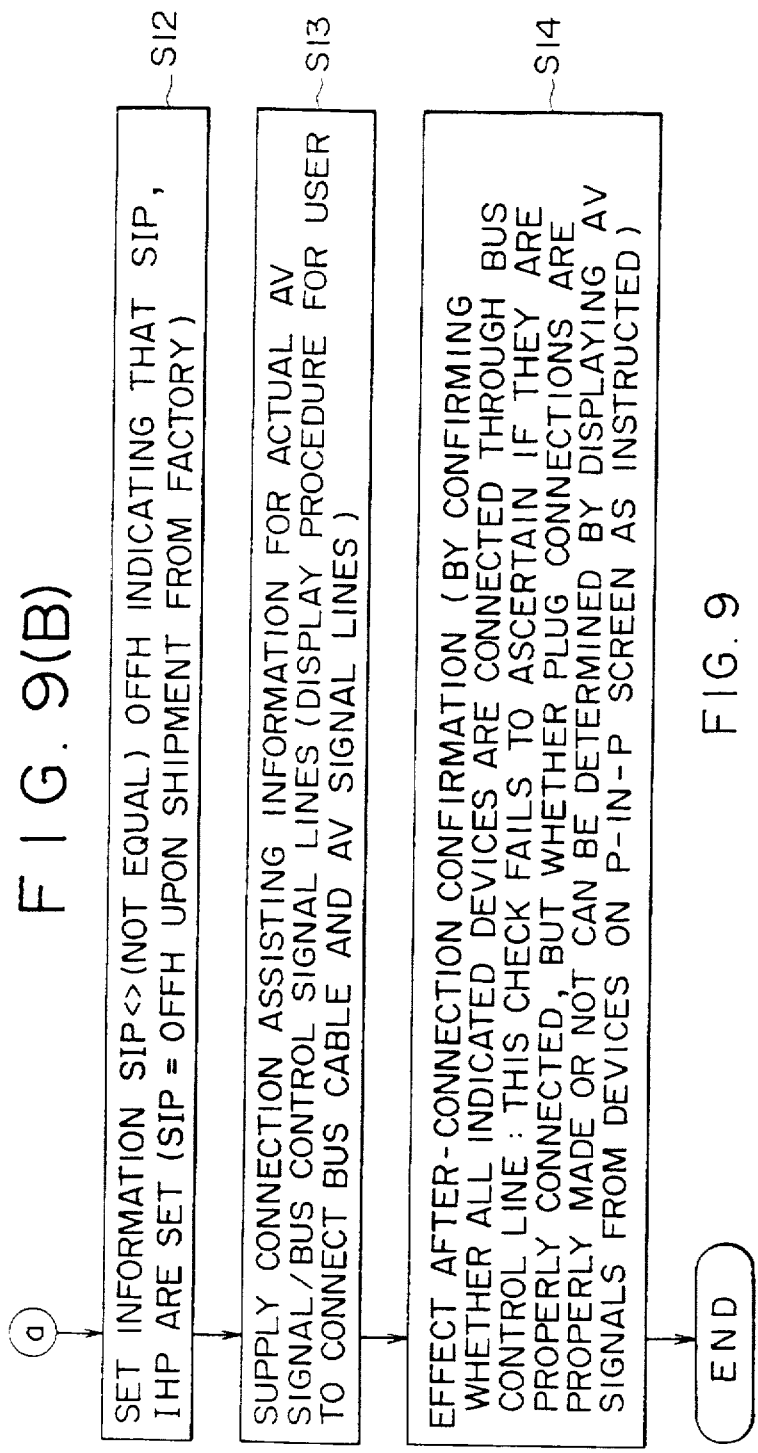

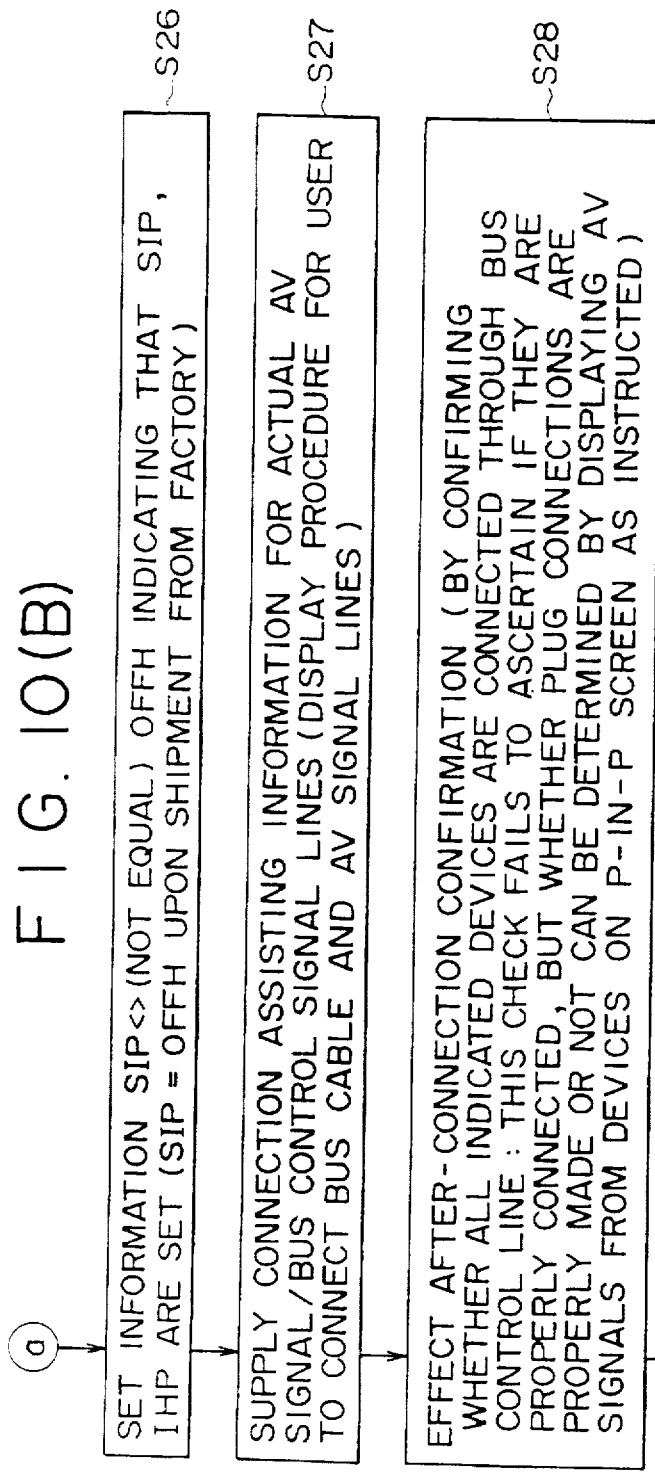

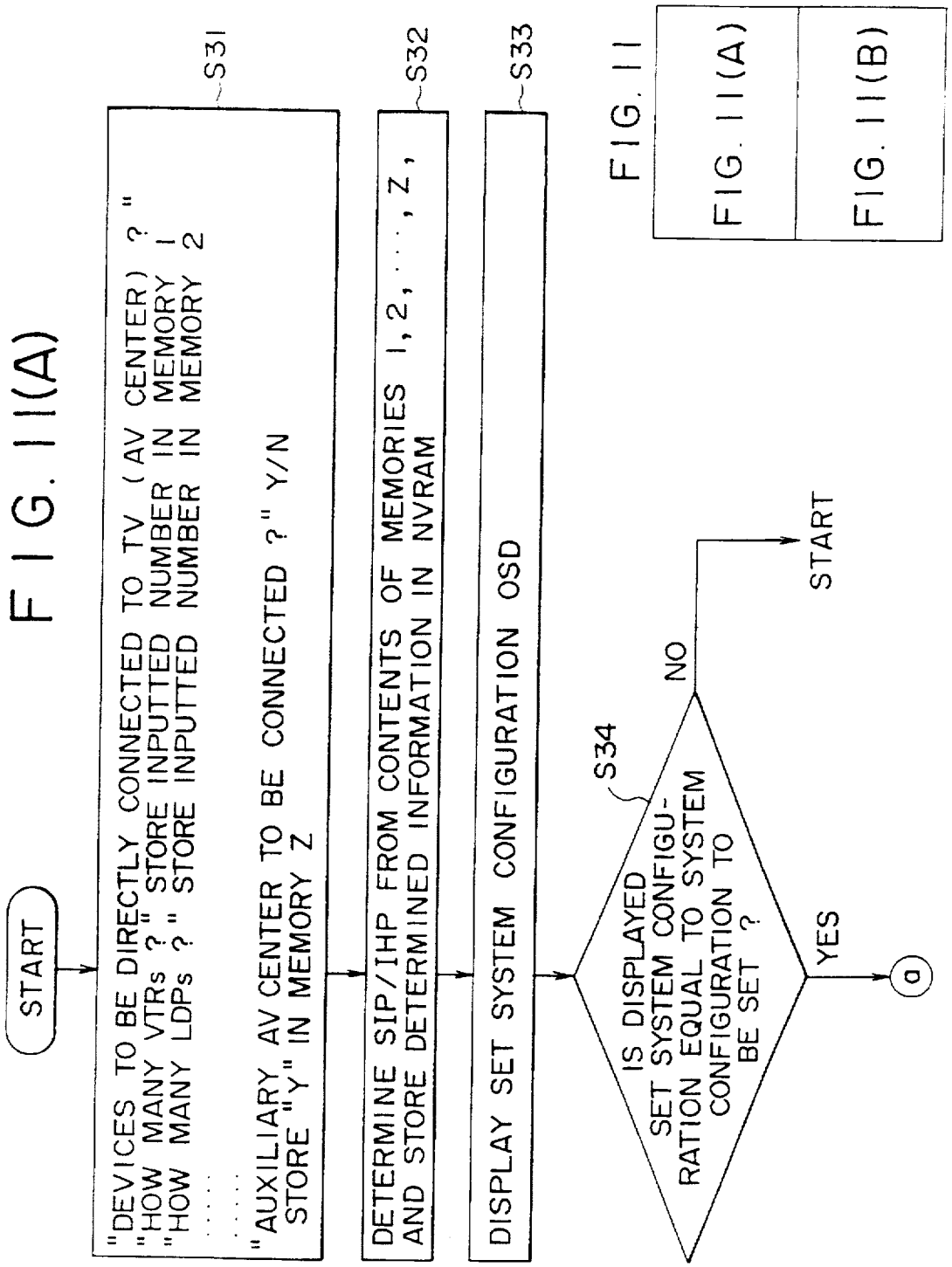

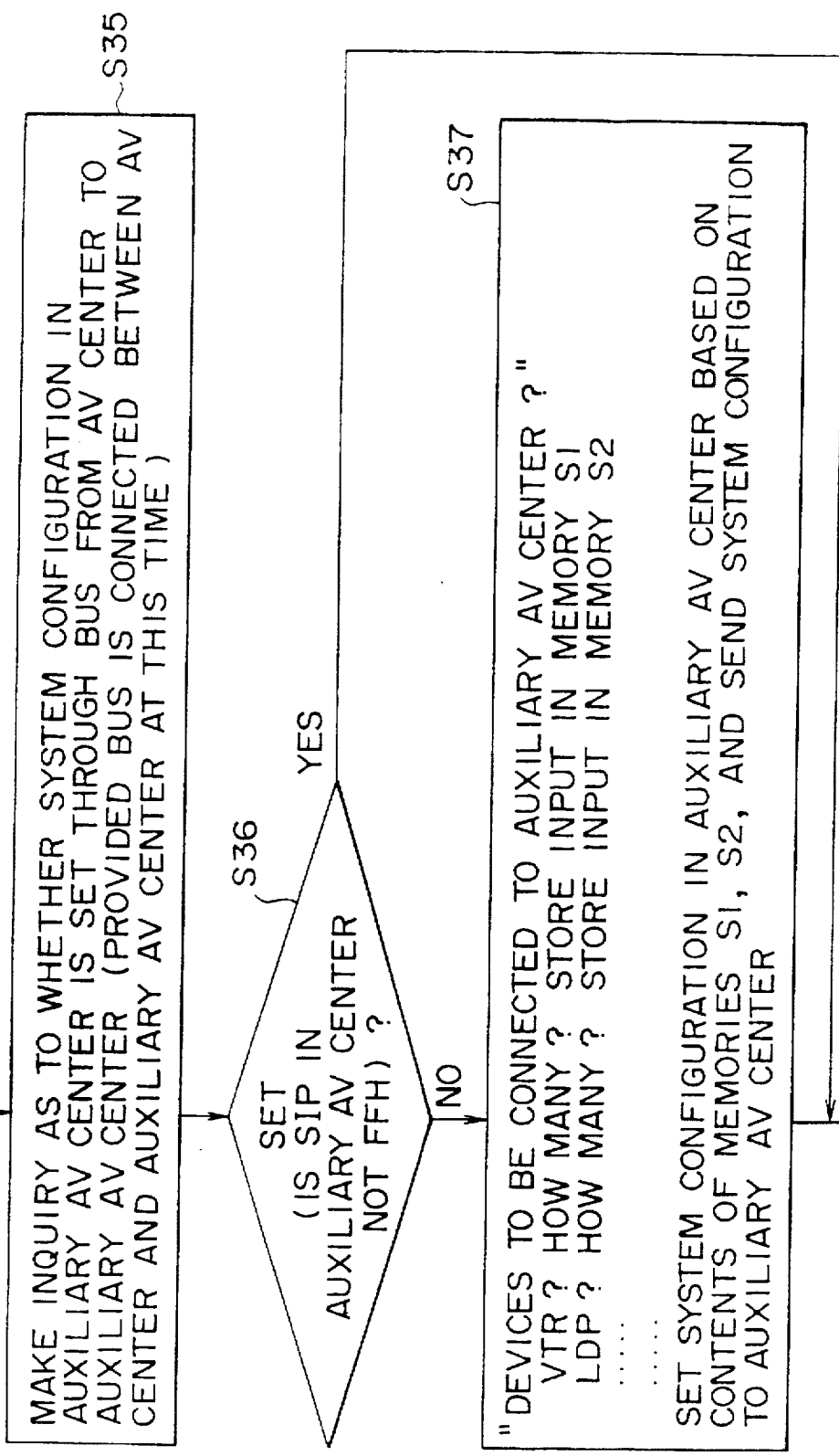
FIG. II(B)

FIG. 15(A)

START → S71: SELECT UP TO 1ST LAYER
"DEVICES TO BE DIRECTLY CONNECTED TO TV (AV CENTER) ?"
"HOW MANY VTRs ?" STORE INPUTTED NUMBER IN MEMORY 1
"HOW MANY LDPs ?" STORE INPUTTED NUMBER IN MEMORY 2
......
"OTHER AV CENTER TO BE CONNECTED ?" STORE Y/N IN MEMORY Z

→ S72: SET ACTUAL SYSTEM CONFIGURATION FROM CONTENTS OF MEMORIES 1, 2, ..., Z AND END SYSTEM SETTING FOR 1ST LAYER

→ S73: SETTING OF 2ND LAYER
"DEVICES TO BE CONNECTED TO 1ST VTR ?"
VTR ? HOW MANY ? STORE INPUT IN MEMORY A1
LDP ? HOW MANY ? STORE INPUT IN MEMORY A2
......
"DEVICES TO BE CONNECTED TO 2ND VTR ?"
VTR ? HOW MANY ? STORE INPUT IN MEMORY A3
LDP ? HOW MANY ? STORE INPUT IN MEMORY A4
......

→ 

| FIG. 15(A) | FIG. 15(B) |

| NUMBER OF PLUGS | P1 | P2 | P3 | P4 | SIPNO | IHP |
|---|---|---|---|---|---|---|
| TV(1)/VTR1 | | | | | 09 | FEH |
| TV(1)/ | | | | LDP | 09 | F7H |
| TV(2)/VTR1 | VTR2 | | | | 09 | FCH |
| TV(2)/VTR1 | | | | LDP | 09 | F6H |
| TV(3)/VTR1 | VTR2 | | | LDP | 09 | F4H |
| TV(3)/VTR1 | VTR2 | VTR3 | | | 09 | F8H |
| TV(4)/VTR1 | VTR2 | VTR3 | LDP | | 09 | F0H |

FIG. 22

(AV CENTER)

| SIPNO | | TV(PLG) | VTR | LDP | AAMP | VTUNER | SUBAVCENTER |
|---|---|---|---|---|---|---|---|
| N01 | TV/VTR | 1(1) | 1 | | | | |
| N02 | TV/LDP | 1(1) | | 1 | | | |
| N03 | TV/VTR1/VTR2 | 1(2) | 2 | | | | |
| N04 | TV/VTR/LDP | 1(2) | 1 | 1 | | | |
| [N05] | TV/VTR1/VTR2/LDP | 1(3) | 2 | 1 | | | |
| *N06 | TV/VTR1/VTR2/LDP | 1(2) | 2 | 1 | | | |
| N07 | TV/VTR1/VTR2/VTR3 | 1(3) | 3 | | | | |
| *N08 | TV/VTR1/VTR2/VTR3 | 1(2) | 3 | | | | |
| [N09] | TV/VTR1/VTR2/VTR3/LDP | 1(4) | 3 | 1 | | | |
| N021 | TV/VTR/A-AMP | 1(2) | 1 | | 1 | | |
| N022 | TV/LDP/A-AMP | 1(2) | | 1 | 1 | | |
| N023 | TV/VTR1/VTR2/A-AMP | 1(3) | 2 | | 1 | | |
| N024 | TV/VTR/LDP/A-AMP | 1(3) | 1 | 1 | 1 | | |
| [N025] | TV/VTR1/VTR2/LDP/A-AMP | 1(4) | 2 | 1 | 1 | | |
| N027 | TV/VTR1/VTR2/VTR3/A-AMP | 1(4) | 3 | | 1 | | |
| [N029] | TV/VTR1/VTR2/VTR3/LDP/AAMP | 1(5) | 3 | 1 | 1 | | |
| N031 | TV/VTR/IMAGETUNER(VU/BS/CS) | 1(2) | 1 | | | 1 | |
| N032 | TV/LDP/VTUNER(VU/BS/CS) | 1(2) | | 1 | | 1 | |
| N033 | TV/VTR1/VTR2/VTUNER | 1(3) | 2 | | | 1 | |
| N034 | TV/VTR/LDP/VTUNER | 1(3) | 1 | 1 | | 1 | |
| [N035] | TV/VTR1/VTR2/LDP/VTUNER | 1(4) | 2 | 1 | | 1 | |
| N037 | TV/VTR1/VTR2/VTR3/VTUNER | 1(4) | 3 | | | 1 | |
| [N039] | TV/VTR1/VTR2/VTR3/LDP/TNER | 1(5) | 3 | 1 | | 1 | |
| N041 | TV/VTR/AAMP/VTUNER | 1(3) | 1 | | 1 | 1 | |
| N042 | TV/LDP/AAMP/VTUNER | 1(3) | | 1 | 1 | 1 | |
| N043 | TV/VTR1/VTR2/AAMP/VTUNER | 1(4) | 2 | | 1 | 1 | |
| N044 | TV/VTR/LDP/AAMP/VTUNER | 1(4) | 1 | 1 | 1 | 1 | |
| [N045] | TV/VTR1/VTR2/LDP/AAMP/VTNR | 1(5) | 2 | 1 | 1 | 1 | |
| N047 | TV/VTR1/VTR2/VTR3/AMP/VTU | 1(5) | 3 | | 1 | 1 | |
| [N049] | TV/VTR1/VTR2/VTR3/LD/AMP/T | 1(6) | 3 | 1 | 1 | 1 | |

FIG. 23

|  | (AV CENTER) | | | | |
|---|---|---|---|---|---|
|  | AMP(PLG) | TDECK | CD | AVTUNER | SUBAVCENTER |
| N051 AVAMP/TDECK | (1) | 1 | | | |
| N052 AVAMP/CD | (1) | | 1 | | |
| N053 AVAMP/TDECK/CD | (2) | 1 | 1 | | |
| N054 AVAMP/TDECK/AVTUNER | (2) | 1 | | 1 | |
| [N055]AVAMP/TDECK/CD/AVTUNER | (3) | 1 | 1 | 1 | |
| [N059]AVAMP/TDECK/TDECK/CD/AVTUNER | (4) | 2 | 1 | 1 | |

FIG. 24

|  | (AV CENTER) TV(PLG) | VTR | LDP | AAMP | VTUNER | SUBAVCENTER |
|---|---|---|---|---|---|---|
| NO101 TV/VTR/SUB | 1(1) | 1 |  |  |  | 1 |
| NO102 TV/LDP/SUB | 1(2) |  | 1 |  |  | 1 |
| NO103 TV/VTR1/VTR2/SUB | 1(3) | 2 |  |  |  | 1 |
| NO104 TV/VTR/LDP/SUB | 1(3) | 1 | 1 |  |  | 1 |
| [NO105]TV/VTR1/VTR2/LDP/SUB | 1(4) | 2 | 1 |  |  | 1 |
| *NO106 TV/VTR1/VTR2/LDP | 1(3) | 2 | 1 |  |  | 1 |
| NO107 TV/VTR1/VTR2/VTR3/SUB | 1(4) | 3 |  |  |  | 1 |
| *NO108 TV/VTR1/VTR2/VTR3/SUB | 1(3) | 3 |  |  |  | 1 |
| [NO109]TV/VTR1/VTR2/VTR3/LDP/SUB | 1(5) | 3 | 1 |  |  | 1 |
|  |  |  |  |  |  |  |
| NO121 TV/VTR/A-AMP(SUB) | 1(2) | 1 |  |  |  | 1 |
| NO122 TV/LDP/A-AMP(SUB) | 1(2) |  | 1 |  |  | 1 |
| NO123 TV/VTR1/VTR2/A-AMP(SUB) | 1(3) | 2 |  |  |  | 1 |
| NO124 TV/VTR/LDP/A-AMP(SUB) | 1(3) | 1 | 1 |  |  | 1 |
| [NO125]TV/VTR1/VTR2/LDP/AAMP(SUB) | 1(4) | 2 | 1 |  |  | 1 |
| NO127 TV/VTR1/VTR2/VTR3/AAMP(SUB) | 1(4) | 3 |  |  |  | 1 |
| [NO129]TV/VTR1/VTR2/VTR3/LDP/AAMP(SUB) | 1(5) | 3 | 1 |  |  | 1 |
|  |  |  |  |  |  |  |
| NO131 TV/VTR/IMAGETUNER/SUB | 1(3) | 1 |  |  | 1 | 1 |
| NO132 TV/LDP/VTUNER/SUB | 1(3) |  | 1 |  | 1 | 1 |
| NO133 TV/VTR1/VTR2/VTUNER/SUB | 1(4) | 2 |  |  | 1 | 1 |
| NO134 TV/VTR/LDP/VTUNER/SUB | 1(4) | 1 | 1 |  | 1 | 1 |
| [NO135]TV/VTR1/VTR2/LDP/VTUNER/S | 1(5) | 2 | 1 |  | 1 | 1 |
| NO137 TV/VTR1/VTR2/VTR3/TUNER/S | 1(5) | 3 |  |  | 1 | 1 |
| [NO139]TV/VR1/VR2/VR3/LDP/TNR/SUB | 1(6) | 3 | 1 |  | 1 | 1 |
|  |  |  |  |  |  |  |
| NO141 TV/VTR/AAMP/VTUNER/SUB | 1(4) | 1 |  | 1 | 1 | 1 |
| NO142 TV/LDP/AAMP/VTUNER/SUB | 1(4) |  | 1 | 1 | 1 | 1 |
| NO143 TV/VTR1/VTR2/AAMP/TNR/SUB | 1(5) | 2 |  | 1 | 1 | 1 |
| NO144 TV/VTR/LDP/AAMP/TNR/SUB | 1(5) | 1 | 1 | 1 | 1 | 1 |
| [NO145]TV/VR1/VR2/LDP/AAMP/TNR/S | 1(6) | 2 | 1 | 1 | 1 | 1 |
| NO147 TV/VR1/VR2/VR3/AMP/TU/SUB | 1(6) | 3 |  | 1 | 1 | 1 |
| [NO149]TV/VR1/VR2/VR3/LD/AMP/TU/S | 1(7) | 3 | 1 | 1 | 1 | 1 |

F I G. 25

|  | (AV CENTER) | | | | |
|---|---|---|---|---|---|
|  | AMP(PLG) | TDECK | CD | AVTUNER | SUBAVCENTER |
| NO151 AVAMP/TDECK/SUBAVCENTER | (2) | 1 |  |  | 1 |
| NO152 AVAMP/CD/SUB | (2) |  | 1 |  | 1 |
| NO153 AVAMP/TDECK/CD/SUB | (3) | 1 | 1 |  | 1 |
| NO154 AVAMP/TDECK/AVTUNER/SUB | (3) | 1 |  | 1 | 1 |
| [NO155] AVAMP/TDECK/CD/AVTUNER/SUB | (4) | 1 | 1 | 1 | 1 |
| [NO159] AVAMP/TDECK/TDECK/CD/TNR/SUB | (5) | 2 | 1 | 1 | 1 |

FIG. 26
N01 TV/VTR
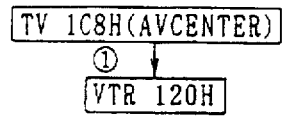
N02 TV/LDP
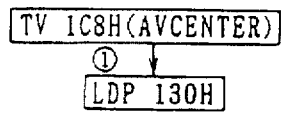
N03 TV/VTR1/VTR2
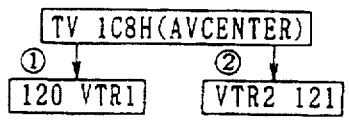
N04 TV/VTR/LDP
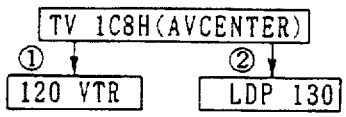
N05 TV/VTR1/VTR2/LDP
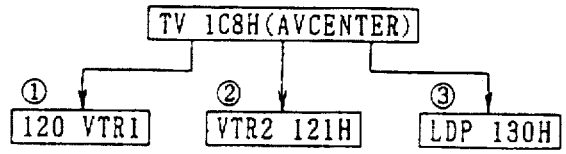
N06 TV/VTR1/VTR2/LDP
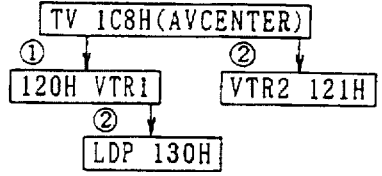
N07 TV/VTR1/VTR2/VTR3
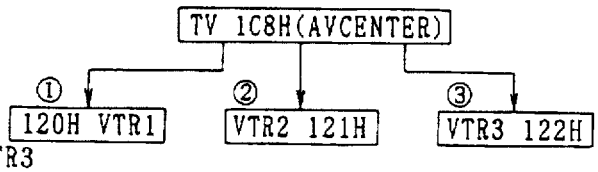
N08 TV/VTR1/VTR2/VTR3
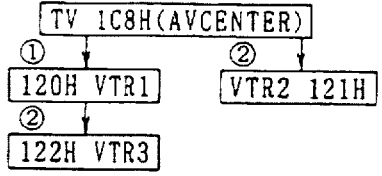
N09 TV/VTR1/VTR2/VTR3/LDP
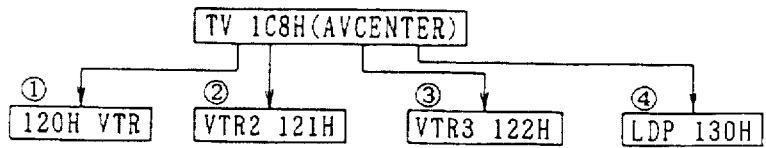

FIG. 27
NO21 TV/VTR/A-AMP
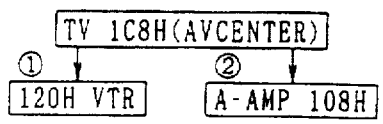
NO22 TV/LDP/A-AMP
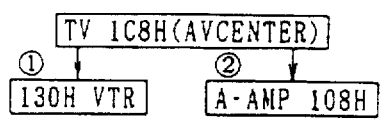
NO23 TV/VTR1/VTR2/A-AMP
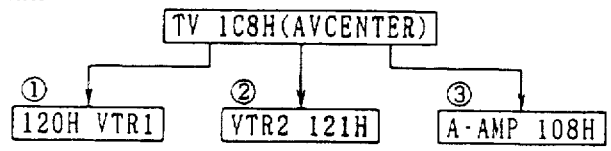
NO24 TV/VTR/LDP/A-AMP
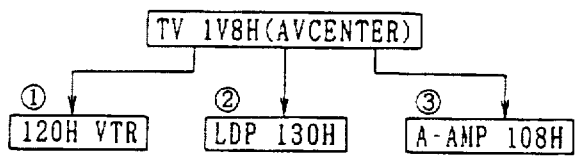
NO25 TV/VTR1/VTR2/LDP/A-AMP
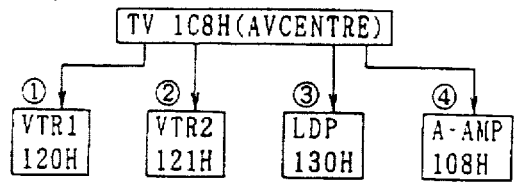
NO27 TV/VTR1/VTR2/VTR3/A-AMP
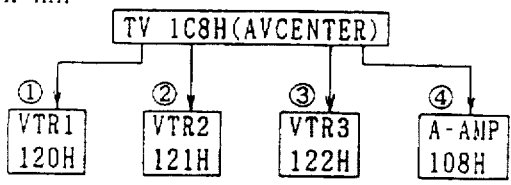
NO29 TV/VTR1/VTR2/VTR3/LDP/A-AMP
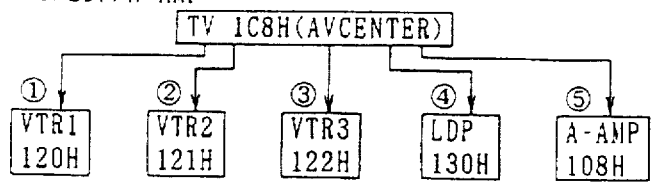

FIG. 28
N031 TV/VTR/VIDEO-TUNER
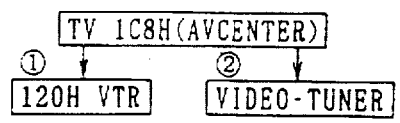
N032 TV/LDP/VIDEO-TUNER
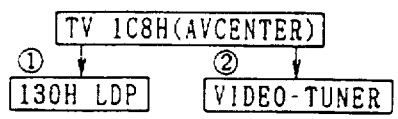
N033 TV/VTR1/VTR2/VIDEO-TUNER
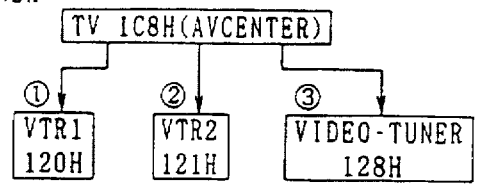
N034 TV/VTR/LDP/VIDEO-TUNER
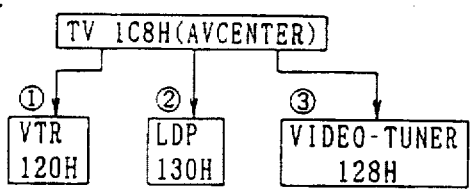
N035 TV/VTR1/VTR2/LDP/VIDEO-TUNER
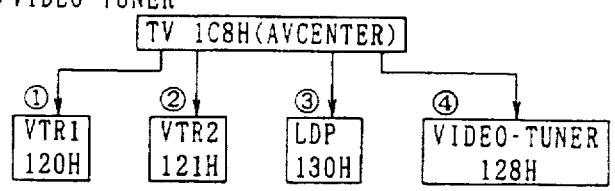
N037 TV/VTR1/VTR2/VTR3/VIDEO-TUNER
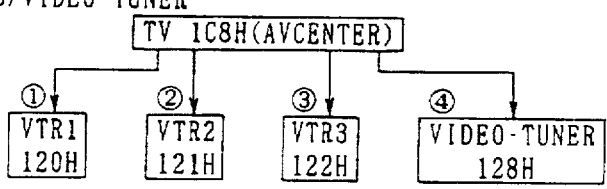
N039 TV/VTR1/VTR2/VTR3/LDP/VIDEO-TUNER
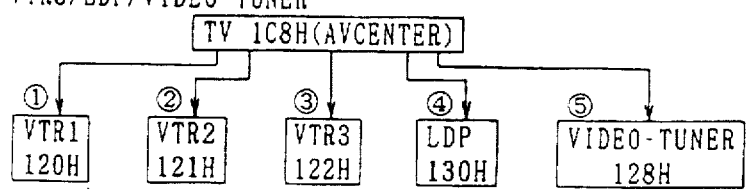

F I G. 29
N041 TV/VTR/AAMP/VTUNER
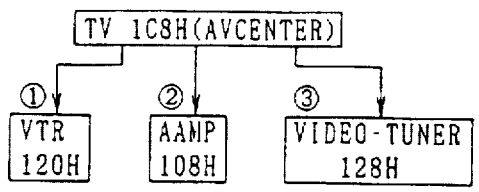
N042 TV/LDP/AAMP/VTUNER
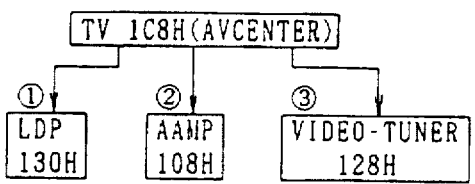
N043 TV/VTR1/VTR2/AAMP/VTUNER
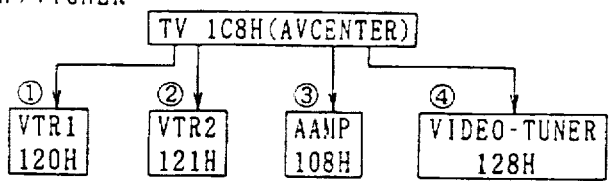
N044 TV/VTR/LDP/AAMP/VTUNER
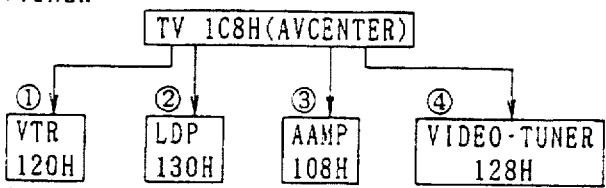
N045 TV/VTR1/VTR2/LDP/AAMP/VTNR
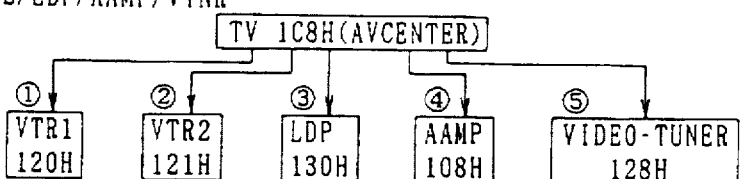
N047 TV/VTR1/VTR2/VTR3/AMP/VTU
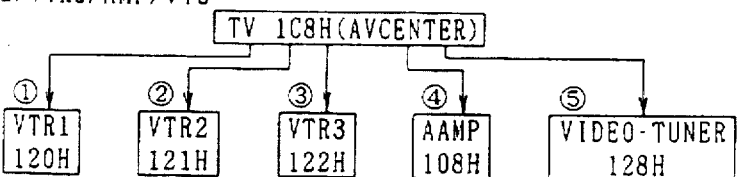
N049 TV/VTR1/VTR2/VTR3/LD/AMP/TU
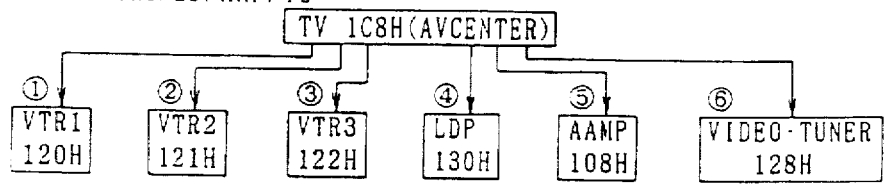

FIG. 30
N051 AVAMP/TAPEDECK
N052 AVAMP/CD
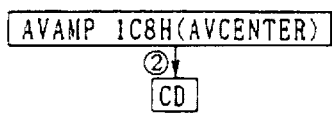
N053 AVAMP/TDECK/CD
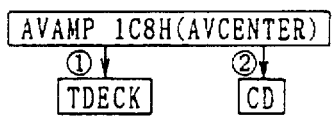
N054 AVAMP/TDECK/AVTUNER
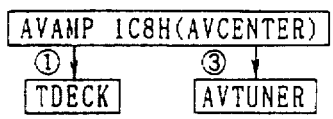
N055 AVAMP/TDECK/CD/AVTUNER
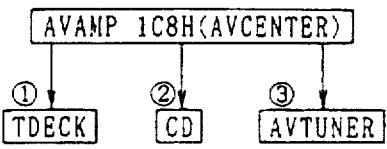
N059 AVAMP/TDECK/TDECK/CD/AVTUNER
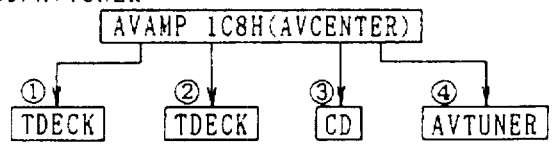

FIG. 31
NO107 TV/VTR1/VTR2/VTR3/SUBAVCENTER
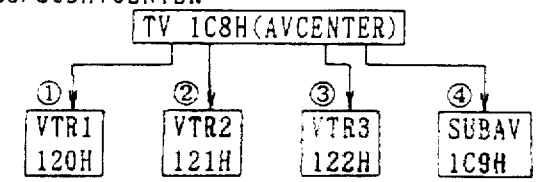
NO109 TV/VTR1/VTR2/VTR3/LDP/SUBAVCENTER
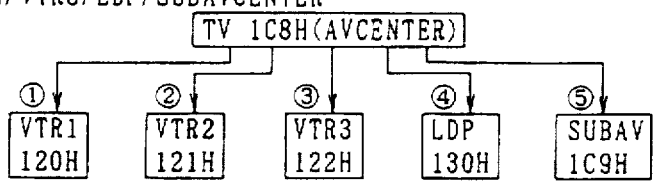
NO127 TV/VTR1/VTR2/VTR3/(A-AMP)SUBAVCENTERN     SAME AS NO107
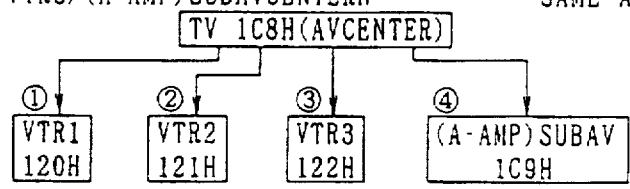
NO129 TV/VTR1/VTR2/VTR3/LDP/SUBAVCENTER     SAME AS NO109
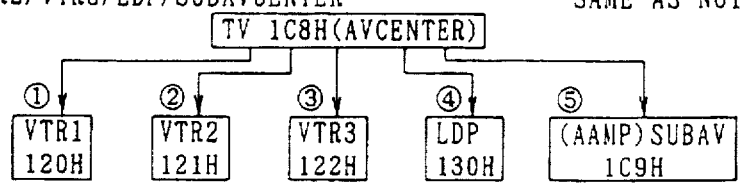
NO157 AVAMP/TDECK/CD/AVTUNER/SUBAVCENTER
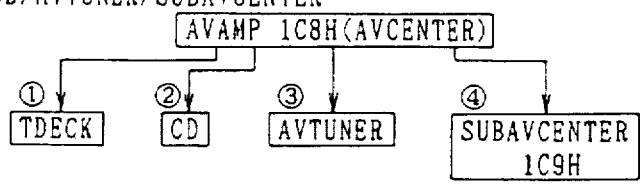
NO159 AVAMP/TDECK/TDECK/CD/AVTUNER/SUBAVCENTER
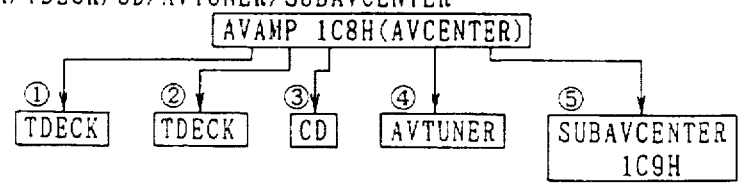

F I G. 32

```
                          (AV CENTER)
SIPNO                  TV(PLG)  VTR LDP AAMP VTUNER SUBAVCENTER
- - - - - - - - - - - - - - - - - - - - - - - - - - - - - - - - - - - - - -
[N05]  TV/VTR1/VTR2/LDP            1(3)  2   1
*N06   TV/VTR1/VTR2/LDP            1(2)  2   1
*N08   TV/VTR1/VTR2/VTR3           1(2)  3
[N09]  TV/VTR1/VTR2/VTR3/LDP       1(4)  3   1

[N025] TV/VTR1/VTR2/LDP/A-AMP      1(4)  2   1   1
[N029] TV/VTR1/VTR2/VTR3/LDP/AAMP  1(5)  3   1   1

[N035] TV/VTR1/VTR2/LDP/VTUNER     1(4)  2   1        1
[N039] TV/VTR1/VTR2/VTR3/LDP/TNER  1(5)  3   1        1

[N045] TV/VTR1/VTR2/LDP/AAMP/VTNR  1(5)  2   1   1    1
[N049] TV/VTR1/VTR2/VTR3/LD/AMP/T  1(6)  3   1   1    1
```

FIG. 33

(AV CENTER)

| | AMP(PLG) | TDECK | CD | AVTUNER | DAT | SUBAVCENTER |
|---|---|---|---|---|---|---|
| [N055] AVAMP/TDECK/CD/AVTUNER | (3) | 1 | 1 | 1 | | |
| [N059] AVAMP/TDECK/CD/AVTUNER | (4) | 2 | 1 | 1 | | |
| N060 AVAMP/DAT=TDECK/CD/AVTUNER | (4) | 1 | 1 | 1 | 1 (DIRECTLY CONNECTED TO TAPE DECK) | |
| N061 AVAMP/DAT=TDECK/TDECK/CD/TNR | (5) | 2 | 1 | 1 | 1 (DIRECTLY CONNECTED TO TAPE DECK) | |

F I G. 34

(AV CENTER)

| | TV(PLG) | VTR | LDP | AAMP | VTUNER | SUBAVCENTER |
|---|---|---|---|---|---|---|
| [NO105]TV/VTR1/VTR2/LDP/SUB | 1(4) | 2 | 1 | | | 1 |
| *NO106 TV/VTR1/VTR2/LDP | 1(3) | 2 | 1 | | | 1 |
| *NO108 TV/VTR1/VTR2/VTR3/SUB | 1(3) | 3 | | | | 1 |
| [NO109]TV/VTR1/VTR2/VTR3/LDP/SUB | 1(5) | 3 | 1 | | | 1 |
| [NO125]TV/VTR1/VTR2/LDP/AAMP(SUB) | 1(4) | 2 | 1 | | | 1 |
| [NO129]TV/VTR1/VTR2/VTR3/LDP/AAMP(SUB) | 1(5) | 3 | 1 | | | 1 |
| [NO135]TV/VTR1/VTR2/LDP/VTUNER/S | 1(5) | 2 | 1 | | 1 | 1 |
| [NO139]TV/VR1/VR2/VR3/LDP/TNR/SUB | 1(6) | 3 | 1 | | 1 | 1 |
| [NO145]TV/VR1/VR2/LDP/AAMP/TNR/S | 1(6) | 2 | 1 | 1 | 1 | 1 |
| [NO149]TV/VR1/VR2/VR3/LD/AMP/TU/S | 1(7) | 3 | 1 | 1 | 1 | 1 |

F I G. 35

```
                                  (AV CENTER)
                          AMP(PLG)  TDECK  CD  AVTUNER  SUBAVCENTER
---------------------------------------------------------------------
[NO155]AVAMP/TDECK/CD/AVTUNER/SUB    (4)     1     1     1         1
[NO159]AVAMP/TDECK/TDECK/CD/TNR/SUB  (5)     2     1     1         1

NO255 DEFINED AS "UNSET" (UPON SHIPMENT FROM FACTORY)
```

AUDIO VIDEO EQUIPMENT SYSTEM WITH BUS LINE AND METHOD OF ESTABLISHING A CONNECTION SETTING FOR THE AUDIO VIDEO EQUIPMENT SYSTEM

This is a continuation of application Ser. No. 08/165,166 filed Dec. 10, 1993, now abandoned.

BACKGROUND OF THE INVENTION

FIELD OF THE INVENTION

The present invention relates to an audio video (AV) equipment system with a bus line and a method of establishing a connection setting for the audio video equipment system.

Conventional audio video equipment systems are composed of a plurality of audio video component devices including a television (TV) set, a video tape recorder (VTR), a laser disc player (LDP), etc.

Since such conventional audio video equipment systems allow their component devices to be connected in all possible configurations, it is necessary for them to have a large storage capacity for storing system configuration information, and the user finds it difficult to simply establish a connection setting for the component devices of the system.

Japanese patent applications Nos. 4-24778 and 4-59499 disclose conventional audio video equipment systems.

SUMMARY OF THE INVENTION

It is an object of the present invention to provide an audio video equipment system having a relatively small storage capacity for storing system configuration information.

Another object of the present invention is to provide a method of simply establishing a connection setting for the component devices of an audio video equipment system.

According the present invention, there is provided an audio video equipment system with a bus line, comprising main control means for controlling an operation of the audio video equipment system, auxiliary control means for controlling an operation an external system through an external bus line controlled by the main control means, memory means for storing a program to control the main control means and/or the auxiliary control means, display means for displaying a status of the audio video equipment system and/or commands applied by the user, selector means for selecting an audio signal and/or a video signal supplied from an external device, and clock means for generating a clock signal to synchronize the operation of the main control means and/or the auxiliary control means.

According to the present invention, there is also provided a system with a hierarchical structure, comprising a main device for controlling all other devices, an auxiliary device controllable by the main device, an auxiliary control device controllable by the main device for controlling the other devices, and a slave device controllable by the auxiliary control device.

According to the present invention, there is further provided a method of establishing a connection setting of a system, comprising the steps of inquiring the user of the system what devices are to be connected to a main device, inquiring the user how many devices are to be connected to the main device, inquiring the user whether an auxiliary control device is to be connected to the main device or not, if the auxiliary control device is to be connected to the main device, inquiring the user what devices are to be connected to the auxiliary control device, and if the auxiliary control device is to be connected to the main device, inquiring the user how many devices are to be connected to the auxiliary control device.

According to the present invention, there is also provided a method of establishing a connection setting of a system to determine a master device, comprising the step of if the user of the system wants to set a predetermined device as a master device, checking whether another device has been set as a master device, with the predetermined device.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIGS. 1, 1(A), and 1(B) depict is a block diagram of an audio video equipment system according to an embodiment of the present invention;

FIG. 2 is a diagram showing, by way of example, system configuration information which is stored in a ROM and indicated by a system information pointer;

FIG. 3 is a diagram showing, by way of example, another system configuration information which is stored in the ROM and indicated by the system information pointer;

FIG. 4 is a diagram showing, by way of example, still another system configuration information which is stored in the ROM and indicated by the system information pointer;

FIGS. 8, 9(A) and 9(B) are flowcharts of a method of establishing a connection setting for the AV equipment system;

FIGS. 10, 10(A), and 10(B) depict is a flowchart of a process of establishing up a system in an auxiliary AV center in order to facilitating the setting up of the system by using the auxiliary AV center;

FIGS. 11, 11(A), 11(B), and 12 are a flowchart of a process of establishing a system in a main AV center in order to facilitating the setting up of the system by using an auxiliary AV center;

FIGS. 15, 15(A), 15(B), and 16 are flowcharts of a process of keeping selected system connection information as it is;

FIG. 18 is a flowchart of a process of an operation sequence when a main power supply that has been turned off is turned on;

FIG. 19 is a diagram showing variations using SIP and IHP;

FIGS. 22 through 25 are diagrams which show, by way of example, designated SIP numbers.

FIGS. 26 through 31 are diagrams which show specific AV system configurations, by way of example.

FIGS. 32 through 35 are diagrams which show, by way of example, other designated SIP numbers.

DETAILED DESCRIPTION OF THE PREFERRED EMBODIMENTS

Figure 5:
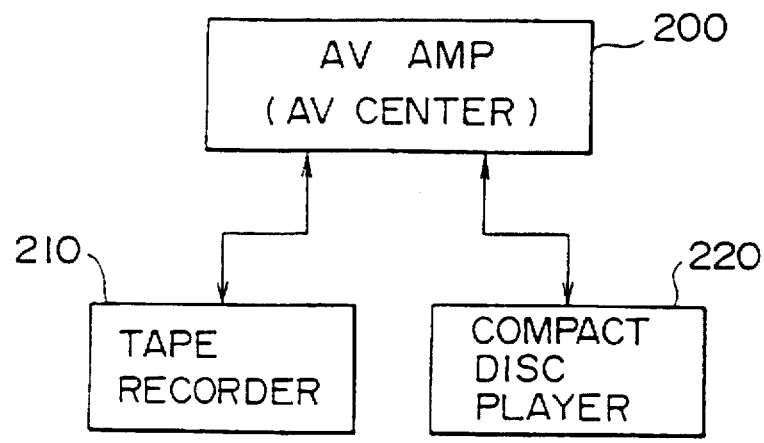
FIG. 5 is a block diagram of an AV equipment system comprising a plurality of audio component devices.

As shown in FIG. 1, an audio video (AV) equipment system according to an embodiment of the present invention comprises an AV center or television (TV) set 100 including a control button 1 which, when pressed, applies a command through an interface 3 and an internal bus 20 to a central processing unit (CPU) 4. The audio video equipment system also has a remote controller 12, which when operated, emits an infrared radiation to a receiver 2. In response to the received infrared emission, the receiver 2 applies a command through the interface 3 and the internal bus 20 to the CPU 4.

To the CPU 4, there are connected, through the internal bus 20, the interface 3, a program read-only memory (ROM) 5, a system configuration information ROM 5A, a random-access memory (RAM) 6, a system information pointer (SIP) memory 6A, a difference information memory 6B, an inhibit plug bit (IHP) memory 6C, a non-volatile memory 7, a clock timer 8, a microcontroller 9 for a domestic digital bus (D2B) communication protocol, a tuner 11, a screen display integrated circuit (IC) 14, and a selector 18.

The CPU 4 processes the applied command to effect various processes, e.g., to output a channel selection command to the tuner 11 and a command to the microcontroller 9.

The program ROM 5 stores a program that is required to operate the CPU 4. The RAM 6 stores data that have been processed by the CPU 4. The non-volatile memory 7 stores data which need to be retained after the power supply is turned off, e.g., data indicating status of connection to other audio video (AV) component devices including a first VTR 30, a second VTR 40, and an LDP 50. The clock timer 8 always measures time and generates time information.

The system configuration information ROM 5A stores a plurality of items of information which represent predetermined system configurations between various AV component devices including the TV set 100, the first and second VTRs 30, 40, and the LDP 50. The SIP memory 6A comprises a RAM for storing an SIP that indicates any of the information representative of the system configurations stored in the system configuration information ROM 5A.

FIGS. 2 through 4 show, by way of example, respective three system configurations stored in the ROM 5A that are indicated by the SIP stored in the SIP memory 6A. The system configuration shown in FIG. 3 includes a pointer for an information table of an auxiliary AV center. The system configuration shown in FIG. 4 includes a pointer for a lower-layer SIP.

The difference information memory 6B comprises a RAM for storing the difference between the system configurations stored in the system configuration information ROM 5A and a certain system configuration. The IHP memory 6B comprises a RAM for storing inhibit plug information or bits indicative of inhibit plugs of the AV component devices including the TV set 100, the first and second VTRs 30, 40, and the LDP 50. The RAM 6, the SIP memory 6A, the difference information memory 6B, and the IHP memory 6C may be composed of a single RAM.

The microcontroller 9 for a D2B communication protocol is connected to the first VTR 30, the second VTR 40, and the LDP 50 through an integrated circuit (IC) 10 for a D2B communication protocol and D2B buses or control lines 21A, 21B, 21C in a star-connection pattern for transmission and reception of data and commands.

In the embodiment shown in FIG. 1, the other AV component devices are connected to the AV center 100, and the IC 10 manages the overall connection information.

The first VTR 30 is connected to a terminal T1 of the selector 18 through an AV signal line 31 for transmitting video and audio signals to and receiving video and audio signals from the selector 18. The second VTR 40 is connected to a terminal T2 of the selector 18 through an AV signal line 41 for transmitting video and audio signals to and receiving video and audio signals from the selector 18. The LDP 50 is connected to a terminal T3 of the selector 18 through an AV signal line 51 for transmitting video and audio signals to and receiving video and audio signals from the selector 18.

Video and audio signals output from the selector 18 are selected by the CPU 4 or the microcontroller 9.

The AV center 100 includes a cathode-ray tube (CRT) 13 for displaying an image represented by the video signal output from the selector 18. The screen display IC 14 displays on-screen display (OSD) data supplied from the microcontroller 9 through the internal bus 20, as a message in a given area on the screen of the CRT 13. The audio signal outputted from the selector 18 is reproduced by a loudspeaker 19.

The control button 1, the receiver 2, the interface 3, the CPU 4, the program ROM 5, the system configuration information ROM 5A, the RAM 6, the SIP memory 6A, the difference information memory 6B, the IHP memory 6C, the non-volatile memory 7, the clock timer 8, the microcontroller 9 for a D2B communication protocol, the IC 10 for a D2B communication protocol, the tuner 11, the CRT 13, the screen display IC 14, the selector 18, and the loudspeaker 19 jointly make up the AV center or TV set 100.

Each of the first VTR 30, the second VTR 40, and the LDP 50 has a microcontroller and an IC for a D2B communication protocol, which transmit and receive command and OSD data through the D2B buses or control lines 21A, 21B, 21C.

FIG. 5 shows in block form an AV system comprising a plurality of audio component devices. In FIG. 5, audio component devices including a tape recorder 210 and a compact disc player 220 are connected to an AV amplifier 200 as an AV center.

Figure 6:
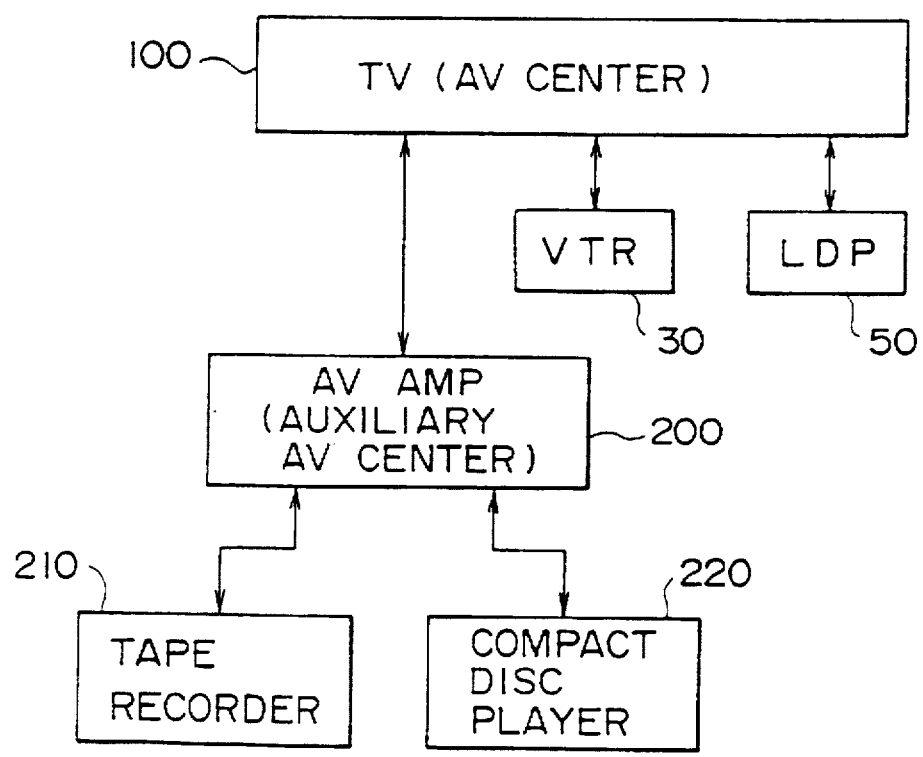
FIG. 6 is a block diagram of an AV equipment system comprising the AV equipment system shown in FIG. 5 and a TV set, a VTR, and an LDP.

FIG. 6 shows in block form an AV system which includes the AV system shown in FIG. 5 and the TV set 100, the VTR 30, and the LDP 50 which are shown in FIG. 1. Specifically, the VTR 30 and the LDP 50 are connected to the TV set 100 as an AV center, and the AV amplifier 200 is connected as an auxiliary AV center to the AV center 100. The auxiliary AV center 200 holds information (first layer) with respect to those devices which are connected directly thereto, and can perform the functions or features of the devices connected directly thereto without referring to information in the host AV center.

Figure 7:
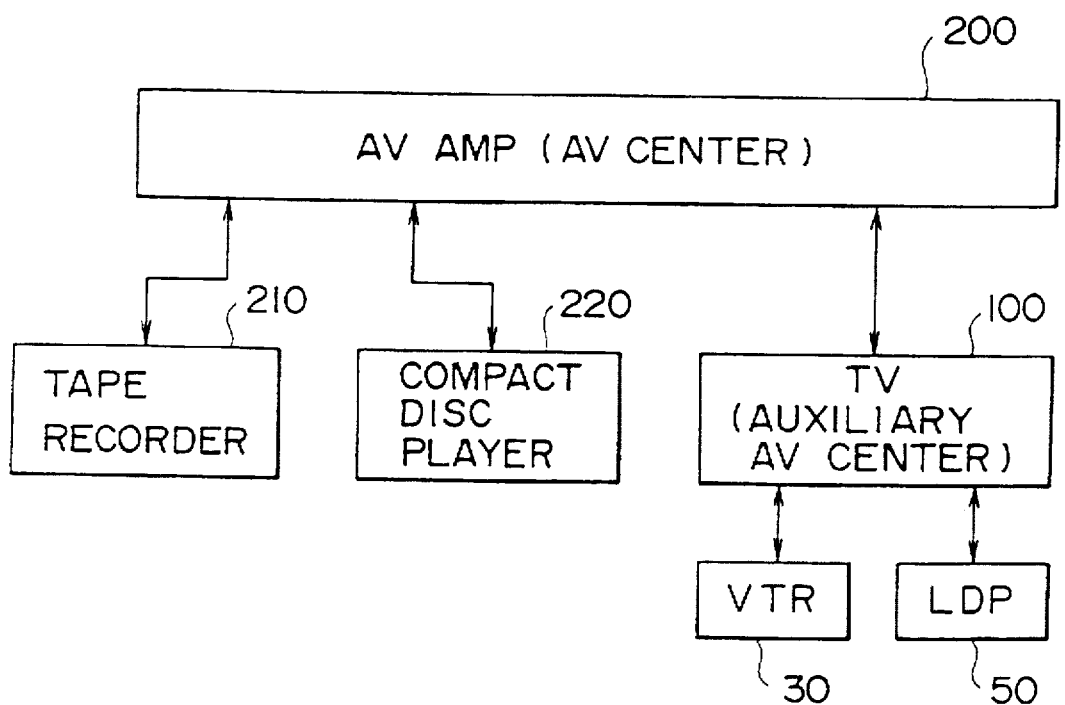
FIG. 7 is a block diagram of another AV equipment system comprising the AV equipment system shown in FIG. 5 and a TV set, a VTR, and an LDP.

FIG. 7 shows in block form another AV system which includes the AV system shown in FIG. 5 and the TV set 100, the VTR 30, and the LDP 50 which are shown in FIG. 1. Specifically, the AV amplifier 200 serves as an AV center, and the TV set 100 is connected as an auxiliary AV center to the AV amplifier 200, with the VTR 30 and the LDP 50 being connected thereto.

Figure 8:
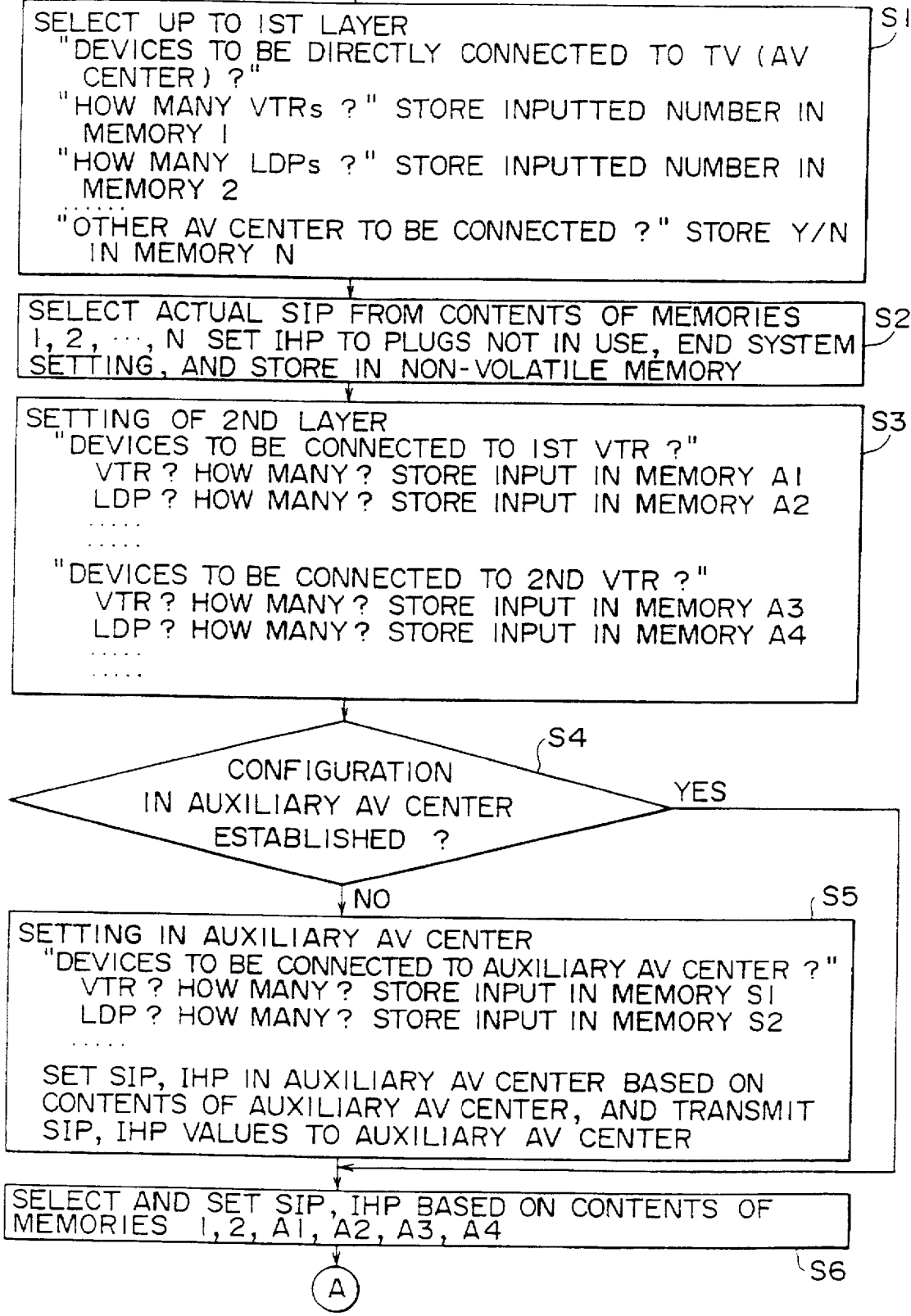

FIGS. 8 and 9 are flowcharts of a method of establishing a connection setting for the AV system. The microcontroller 9 controls the screen display IC 14 to display a menu or message on the CRT 13 to ask the user the component devices that the user wants to be connected to the TV set 100 as the AV center, i.e., to ask the user the component devices to be connected in a first layer in a step S1. Specifically, the microcontroller 9 asks the user how many VTRs, LDPs, etc. are to be connected, asks the user if another AV center is to be connected, and stores the user's answers from the remote controller 12 in memories 1, 2, . . . N.

Then, the microcontroller 9 selects the actual SIP from the contents of the memories 1, 2, . . . N, temporarily stores the selected SIP in the SIP memory 6A, sets the IHP corresponding to plugs not in use, stores the set IHP in the IHP memory 6C, and thereafter stores the SIP and the IHP in the non-volatile memory 7, thus finishing the connection setting for the first layer in a step S2.

Thereafter, the microcontroller 9 establishes a connection setting for a second layer. Specifically, the microcontroller 9 controls the screen display IC 14 to display a menu or message on the CRT 13 to ask the user the component devices that the user wants to be connected to the component devices which are connected to the TV set 100 as the AV center, i.e., to ask the user the component devices to be connected in a second layer in a step S3. Specifically, the microcontroller 9 asks the user how many component devices are to be connected to the component devices that are connected to the AV center 100, e.g., the first VTR and the second VTR, and which component devices are to be connected, and stores the user's answers from the remote controller 12 in memories A1, A2, A3, A4 . . . .

Then, the microcontroller 9 determines whether a configuration setting in the auxiliary AV center has already been established or not in a step S4. If a configuration setting in the auxiliary AV center has already been established, then control jumps to a step S6. If a configuration setting in the auxiliary AV center has not been established, then control proceeds to a step S5.

In the step S5, the microcontroller 9 controls the screen display IC 14 to display a menu or message on the CRT 13 to ask the user the component devices that the user wants to be connected to the auxiliary AV center and the number of such component devices, and stores the user's answers from the remote controller 12 in memories S1, S2, . . . . Then, based on the contents of the memories S1, S2, . . . , the microcontroller 9 establishes the SIP for the auxiliary AV center and temporarily stores the SIP in the SIP memory 6A, sets the IHP corresponding to plugs not in use of the auxiliary AV center, temporarily stores the set IHP in the IHP memory 6C, thereafter stores the SIP and the IHP in the non-volatile memory 7, and transmits the set SIP and IHP values to the auxiliary AV center.

In a next step S6, the microcontroller 9 selects and sets the SIP and the IHP based on the contents of the memories 1, 2, . . . , A1, A2, A3, A4, . . . . Then, the microcontroller 9 determines whether or not a system configuration requested by the user is a predetermined system configuration, i.e., is represented by the system configuration information stored in the ROM 5A, in a step S7. If not, the predetermined system configuration in the step S7, and also if the information of the difference between the system configuration requested by the user and the predetermined system configuration is stored in the difference information memory 6B (YES in a step S8), then the difference information is stored in the non-volatile memory 7 in a step S9. If the difference information is not stored in the difference information memory 6B (NO in the step S8), then the microcontroller 9 controls the screen display IC 14 to display a system setting disability on the CRT 13, prompting the user to set a system configuration again in a step S10. If there is an input to set a system configuration again (YES in a step S11), then control goes back to START in FIG. 8. If there is no input to set a system configuration again, then control goes to an end.

If the system configuration requested by the user is the predetermined system configuration (YES in the step S7), or after the difference information is stored in the non-volatile memory 7 in the step S9, the microcontroller 9 sets information indicating that the SIP and the IHP have been set in a step S12, and then supplies actual connection assisting information for the AV signal/bus signal control lines in a step S13. Thereafter, the microcontroller 9 effects an after-connection confirmation process, i.e., confirms that all the indicated component devices have been connected through the bus, and detects and displays whether AV signals are supplied from the component devices, thus checking whether the plugs are properly connected or not, in a step S14.

In the embodiment shown in FIGS. 8 and 9, since connections are selected in each of the layers, a selection in each layer is made from relatively few combinations, making it easy for the user to establish a connection setting. As the overall system configuration is controlled based on the SIP in the AV center and the SIP in a lower layer, it can be controlled with smaller data than if connection information not divided in layers were controlled.

If the information with respect to the second layer is the predetermined system configuration information, i.e., the SIP, then the plug information in the ROM indicated by the SIP is used (e.g., the SIP No. 8, SIP No. 9, or the like). If the information with respect to the second layer is not the predetermined system configuration information, then the difference information is stored in the non-volatile memory 7. Such a condition occurs when the AV center only has fewer plugs than the system configurations requested by the user. A connection setting can be established much easier if such difference information is not stored and a system is set up in a combination of an AV center and an auxiliary AV center (limited to only one) which may be represented by the SIP and the HIP only.

With the conventional AV equipment system, the connection information is controlled in only one layer because each component device grasps connection information up to an adjacent component device. Therefore, when any of various features, e.g., a one-touch playback feature, is to be performed, the component device which effects the feature has to complete the overall connections. Since each component device grasps connection information up to an adjacent component device, if the final component for performing the feature is connected before an adjacent component device, a connection command is propagated, i.e., a connection command for an adjacent component device is propagated successively through component devices until it reaches the final component device, in order to complete the connections.

The AV equipment system according to this embodiment does not employ the conventional discrete architecture, but is constructed around the AV center which holds all the system configuration information for allowing a connection setting to be established with respect to each of component devices without successively transmitting connection commands to the bus when a feature is performed.

With such an arrangement, since the system configuration information controlled by the AV center is increased, the system configurations are controlled based on the SIP according to this embodiment. If indefinite system configurations are permitted, then since the AV center undergoes an increased storage and control burden, it is preferable to limit a maximum number of controlled layers to a realistic level to achieve an overall balanced condition with respect to the amount of information processed, the amount of data stored, and the number of combinations that can be controlled.

Specifically, predetermined system configurations, i.e., the SIP, are arranged in two layers, and even when a relatively large AV equipment system is considered, an arrangement in which the number of AV terminals of the AV center is increased to complete the system in one layer as much as possible is provided, and may be indicated with the SIP. Any expansion may be limited to system arrangements within a range of system configurations in which one AV center is included.

When the user requests a system including an AV center, a pointer for the plug connection information table may be defined at the "POINTER FOR EXT-AUXILIARY AV CENTER INFORMATION TABLE" of the system connection information developed with the basic SIP as shown in FIGS. 3 and 4.

Figure 10A:
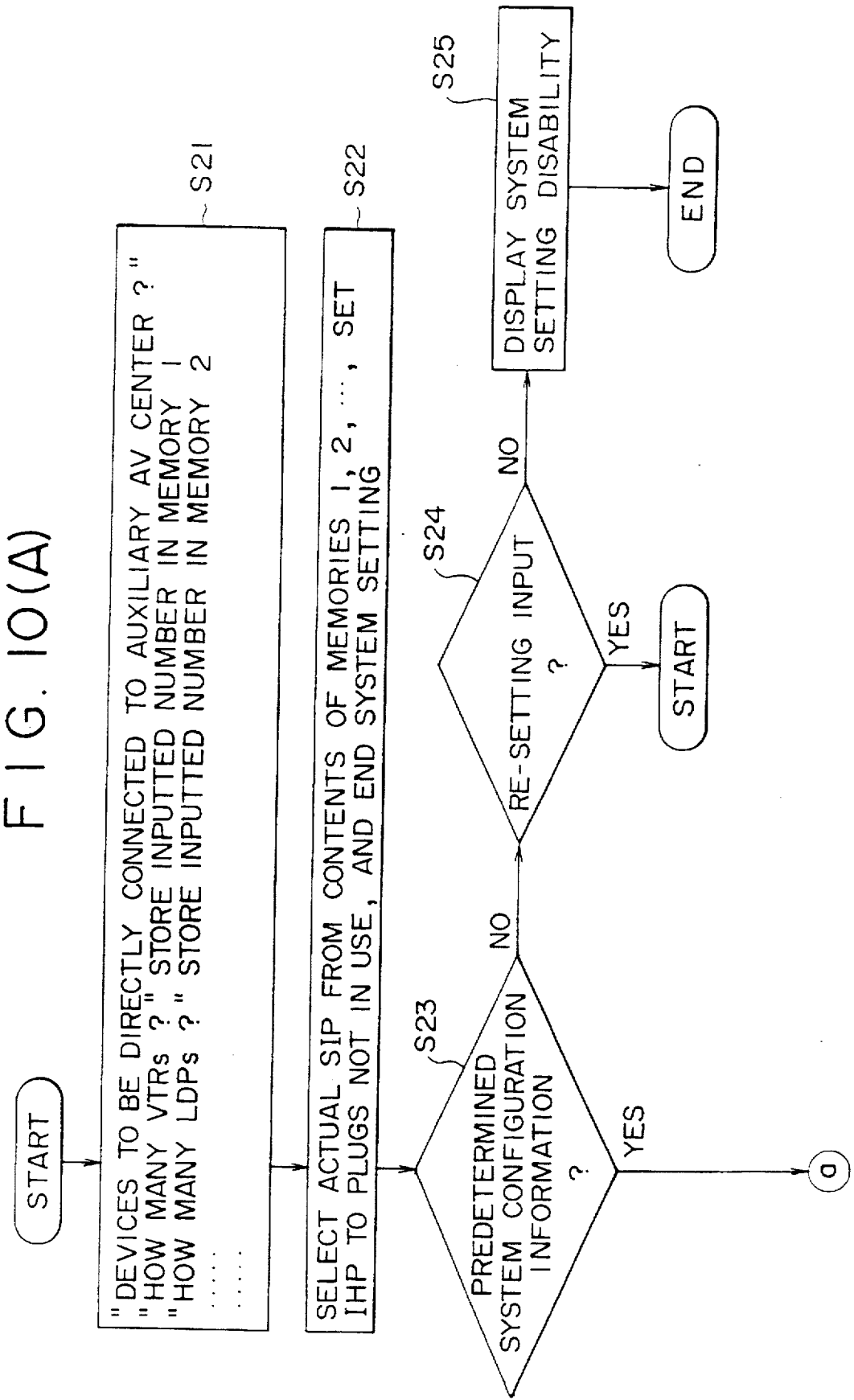

FIG. 10 shows a process of establishing up a system in the auxiliary AV center in order to facilitate the setting up of the system by using the auxiliary AV center. The microcontroller for the D2B communication protocol in the auxiliary AV center displays a menu or message to ask the user the component devices which the user wants to be connected to the auxiliary AV center and the number of the component devices, and stores the user's answers in the memories 1, 2, . . . in a step S21.

Then, the microcontroller for the D2B communication protocol selects the actual SIP from the contents of the memories 1, 2, . . . , temporarily stores the selected SIP in the SIP memory, sets the IHP corresponding to plugs not in use, stores the set IHP in the IHP memory, and thereafter stores the SIP and the IHP in the non-volatile memory, thus finishing the connection setting in a step S22.

Then, the microcontroller for the D2B communication protocol determines whether or not a system configuration requested by the user is a predetermined system configuration in a step S23. If not the predetermined system configuration is in the step S23, and also if there is an input to set a system configuration again (YES in a step S24), then control goes back to START in FIG. 10. If there is no input to set a system configuration again, then a system setting disability is displayed in a step S25 and control goes to an end.

If the system configuration requested by the user is the predetermined system configuration (YES in the step S23), the microcontroller for the D2B communication protocol sets information indicating that the SIP and the IHP have been set in a step S26, and then supplies actual connection assisting information for the AV signal/bus signal control lines in a step S27. Thereafter, the microcontroller for the D2B communication protocol effects an after-connection confirmation process, i.e., confirms that all the indicated component devices have been connected through the bus, and detects and displays whether AV signals are supplied from the component devices, thus checking whether the plugs are properly connected or not, in a step S28.

Figure 12:
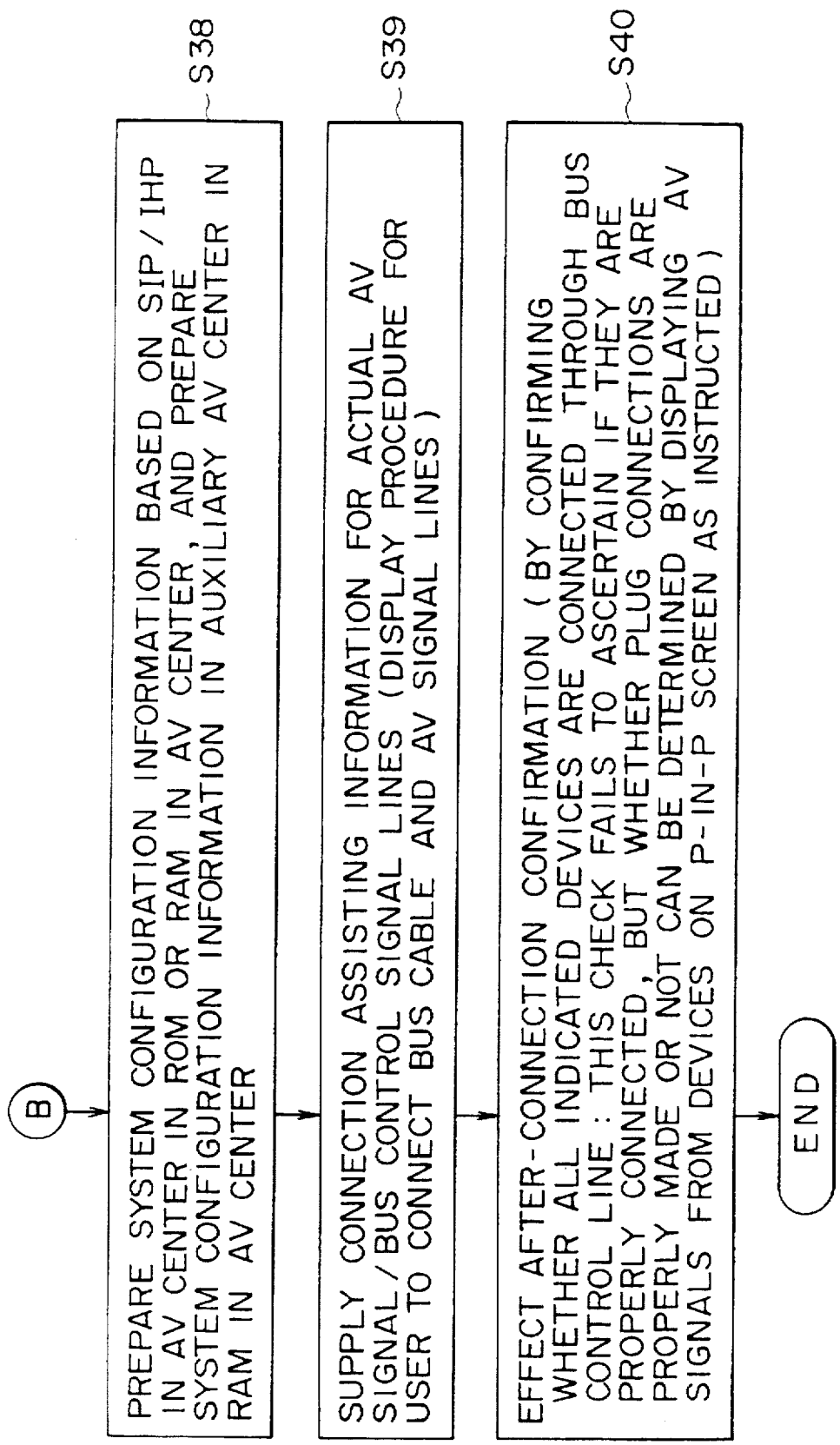

FIGS. 11 and 12 show a process of establishing a system in the main AV center in order to facilitate the setting up of the system by using the auxiliary AV center. The microcontroller 9 for the D2B communication protocol controls the screen display IC 14 to display a menu or message on the CRT 13 to ask the user the component devices that the user wants to be connected to the TV set 100 as the AV center in a step S31. Specifically, the microcontroller 9 asks the user how many VTRs, LDPs, etc. are to be connected, asks the user if an auxiliary AV center is to be connected, and stores the user's answers from the remote controller 12 in memories 1, 2, . . . , Z.

Then, the microcontroller 9 selects the actual SIP from the contents of the memories 1, 2, . . . , Z, temporarily stores the selected SIP in the SIP memory 6A, sets the IHP corresponding to plugs not in use, stores the set IHP in the IHP memory 6C, and thereafter stores the SIP and the IHP in the non-volatile memory 7 in a step S32. The microcontroller 9 then controls the screen display IC 14 to display the established system configuration on the CRT 13 in a step S33.

Then, if the user applies an input signal indicating that the displayed system configuration is the same as the system configuration that he has requested (YES in a step S34), then the microcontroller 9 asks the auxiliary AV center to determine whether a system configuration has been established in the auxiliary AV center in steps S35, S36. If a system configuration has been established, then control jumps to a step S38. If not, then control goes to a step S37.

In the step S37, the microcontroller 9 controls the screen display IC 14 to display a menu or message on the CRT 13 to ask the user the component devices that the user wants to be connected to the auxiliary AV center and the number of such component devices, and stores the user's answers from the remote controller 12 in the memories S1, S2, . . . . Then, based on the contents of the memories S1, S2, . . . , the microcontroller 9 establishes the SIP and temporarily stores the SIP in the SIP memory 6A, sets the IHP corresponding to plugs not in use of the auxiliary AV center, temporarily stores the set IHP in the IHP memory 6C, thereafter stores the SIP and the IHP in the non-volatile memory 7, and transmits the set SIP and IHP values to the auxiliary AV center.

In the step S38, the microcontroller 9 prepares system configuration information based on the SIP/IHP in the AV center in the RAM 6, and also prepares system configuration information in the auxiliary AV in the RAM 6. Then, the microcontroller 9 supplies actual connection assisting information for the AV signal/bus signal control lines in a step S39, and effects an after-connection confirmation process, i.e., confirms that all the indicated component devices have been connected through the bus, and detects and displays whether AV signals are supplied from the component devices, thus checking whether the plugs are properly connected or not, in a step S40.

Since the auxiliary AV center is employed, it is not necessary to establish, all over again, the system configuration that has been in use so far, and it is possible to establish a newly added system as a host system in addition to the system that has been in use so far, to establish a newly added system as a slave system in addition to the system that has been in use so far (with the new system as an auxiliary AV center and the system in use so far as the AV center).

For example, the value 1 in the position of 100 of the SIP in the AV center represents a configuration in which one auxiliary AV center is connected to a system represented by the position of 10.

When the user establishes a system configuration in combination with an auxiliary AV center, it is preferable that the auxiliary AV center have a function of setting the SIP and component devices be connected thereto in one layer. When the user of an auxiliary AV center is established while an AV center is being established, a value following the position of 100 in the SIP is set, for example. When the SIP and the IHP are in use, only positions following the position of 100 in the SIP may be used, and those positions up to the position of 100 in the SIP may be used to define another combination.

Figure 13:
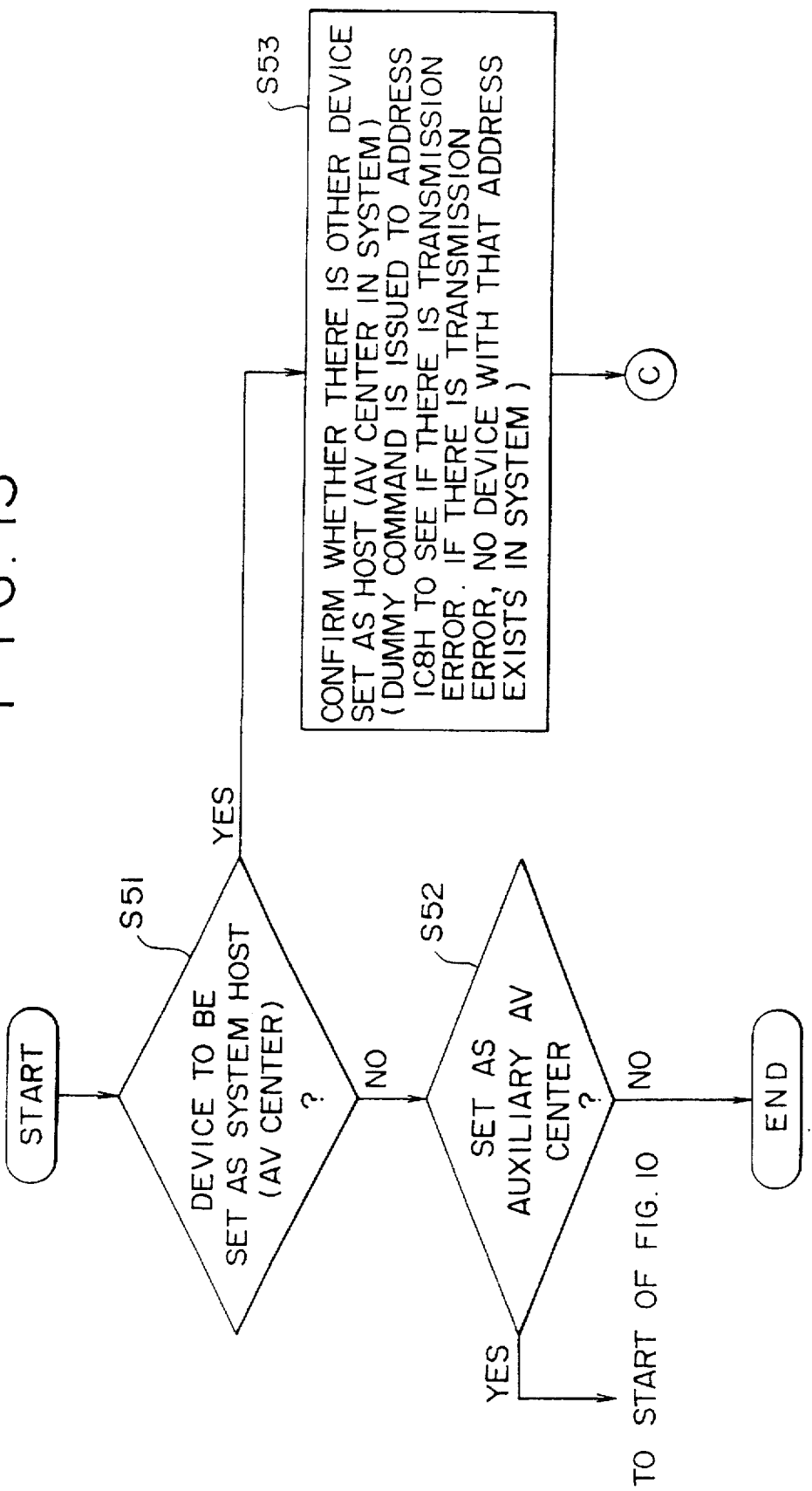
FIGS. 13, 14(A), and 14(B) are flowcharts of a process of establishing an AV center.
Figure 14A:
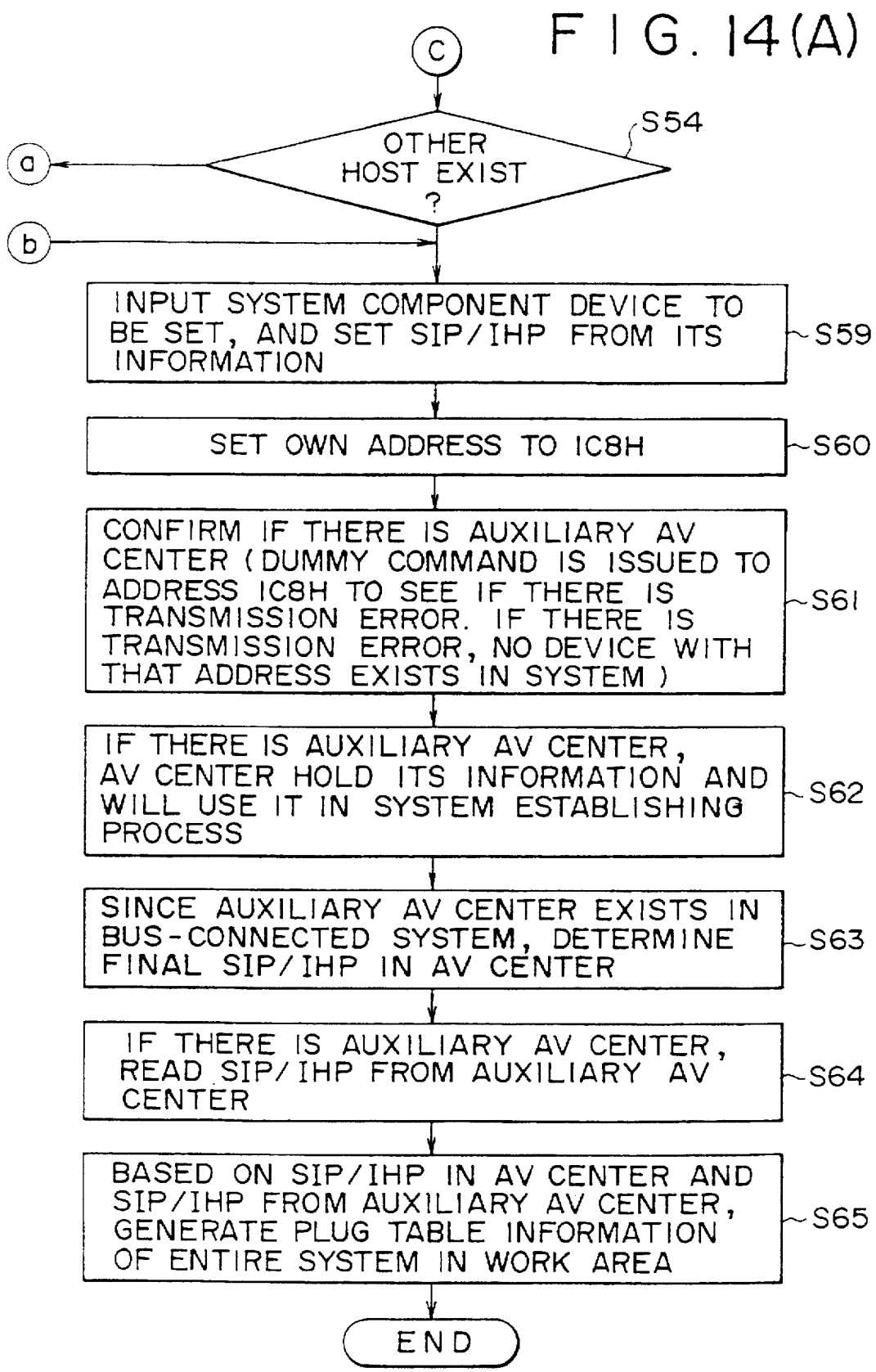
Figure 14B:
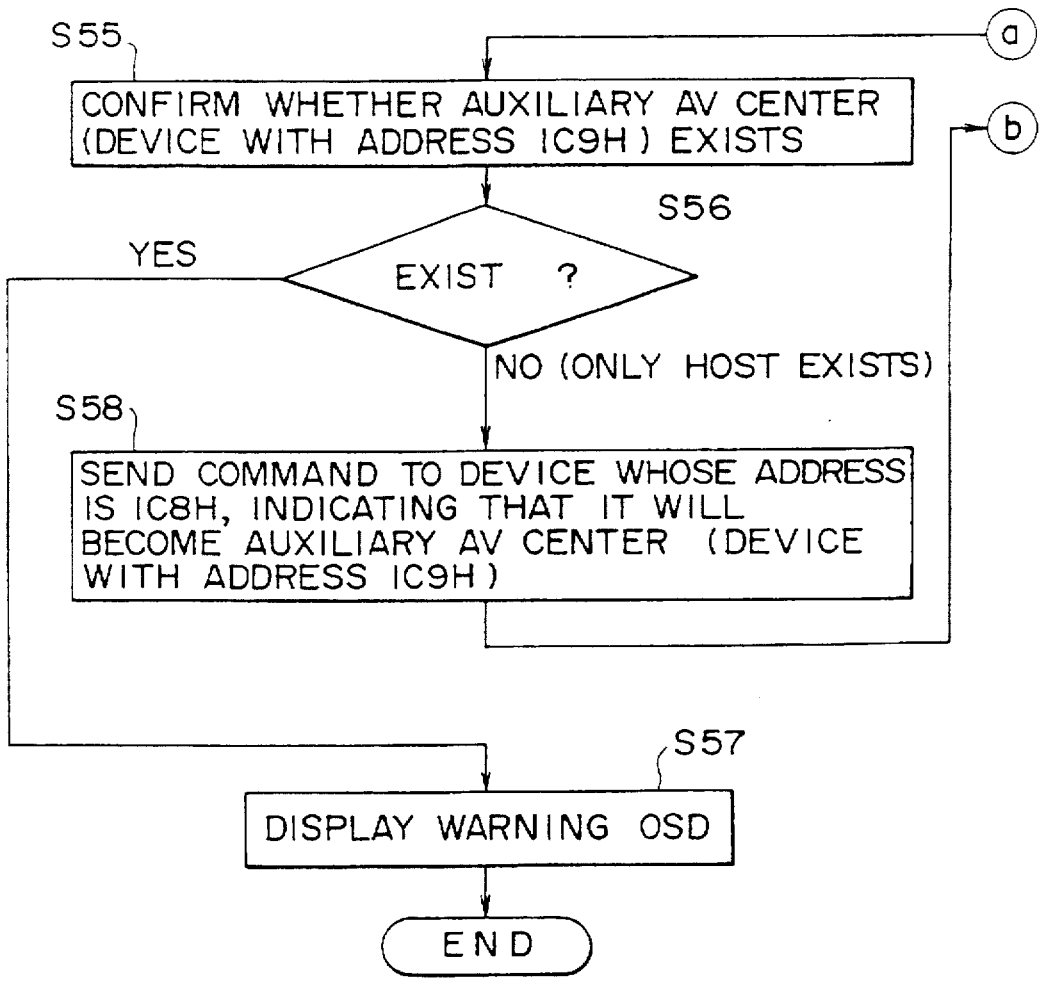
Figure 14:
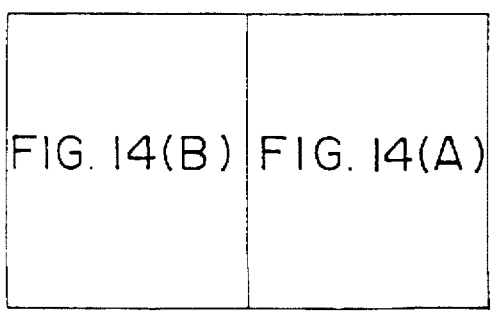

FIGS. 13 and 14 show a process of establishing an AV center. It is assumed in this process that component devices including an auxiliary AV center are connected to the AV bus, and those circuit portions of the component devices which are related to the communications process are turned on. The microcontroller for the D2B communication protocol in a component device displays a menu or message to ask the user if the component device is to be established as a host, i.e., an AV center, of the system in a step S51. If the component device is not to be established as an AV center, then the microcontroller for the D2B communication protocol in the component device displays a menu or message to ask the user if the component device is to be established as an auxiliary AV center in a step S52. If the component device is not to be established as an AV center, then control ends. If the component device is to be established as an AV center, then the microcontroller for the D2B communication protocol executes the process shown in FIG. 10.

If the component device is to be established as an AV center in the step S51, then the microcontroller for the D2B communication protocol confirms whether there is a component device that is established as an AV center in the system in a step S53. Specifically, the microcontroller for the D2B communication protocol sends a dummy command to an address 1C8H (which is the address of an AV center). If a transmission error occurs, then it can be found that there is no other AV center in the system.

If there is a host or AV center (YES in a step S54), then the microcontroller for the D2B communication protocol confirms whether there exists another auxiliary AV center (component device whose address is 1C9H) or not in a step S55. If such another auxiliary AV center exists (YES in a step S56), then the microcontroller for the D2B communication protocol displays a warning in a step S57.

If no other auxiliary AV center exists in the step S56, then the microcontroller for the D2B communication protocol transmits a command to another AV center whose address is 1C8H, indicating that the other AV center will become an auxiliary AV center (component device whose address is 1C9H) in a step S58.

If there is no other AV center (NO in the step S54), or after the step S58, the microcontroller for the D2B communication protocol sets the SIP and the IHP based on system configuration information input by the user in a step S59. The microcontroller for the D2B communication protocol sets the address of the component device to 1C8H, establishing the component device as an AV center in a step S60. Then, the microcontroller for the D2B communication protocol confirms whether there is established another auxiliary AV center in a step S61. Specifically, the microcontroller for the D2B communication protocol sends a dummy command to an address 1C9H. If a transmission error occurs, then it can be found that there is no other auxiliary AV center in the system. If there is another auxiliary AV center, then the microcontroller for the D2B communication protocol in the AV center or the component device keeps the information indicative of the other auxiliary AV center, and will use it in a system establishing process in a step S62. Since whether there is an auxiliary AV center or not within the bus-connected system is determined, the microcontroller for the D2B communication protocol sets the SIP and the IHP finally in the AV center in a step S63.

Then, if there is an auxiliary AV center, the microcontroller for the D2B communication protocol in the AV center or the component device reads the SIP and the IHP from the auxiliary AV center in a step S64, and generates plug table information of the entire system in a work region based on the SIP and the IHP that have been read and also the SIP and the IHP in the AV center in a step S65.

Figure 15:
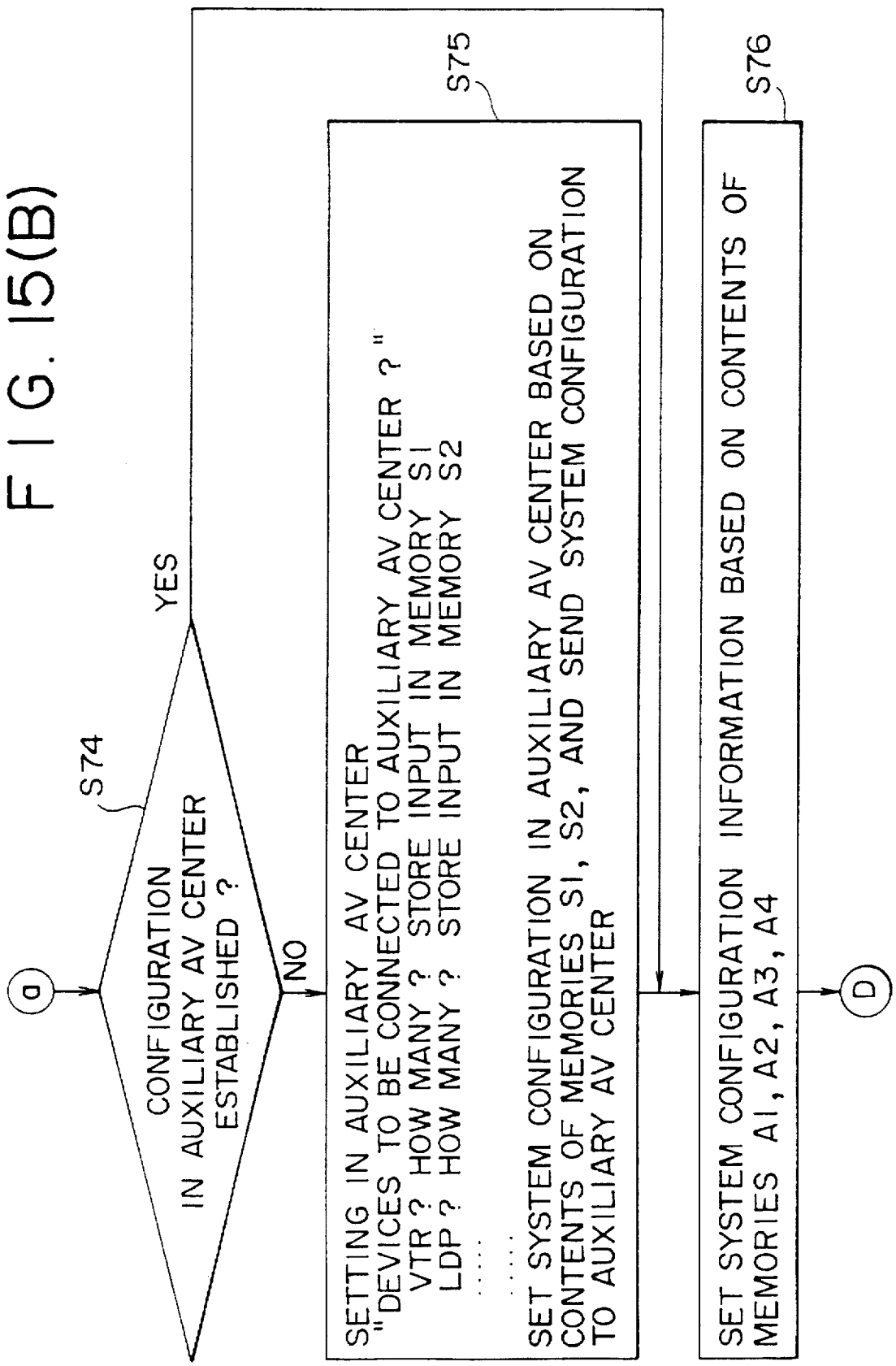
Figure 16:
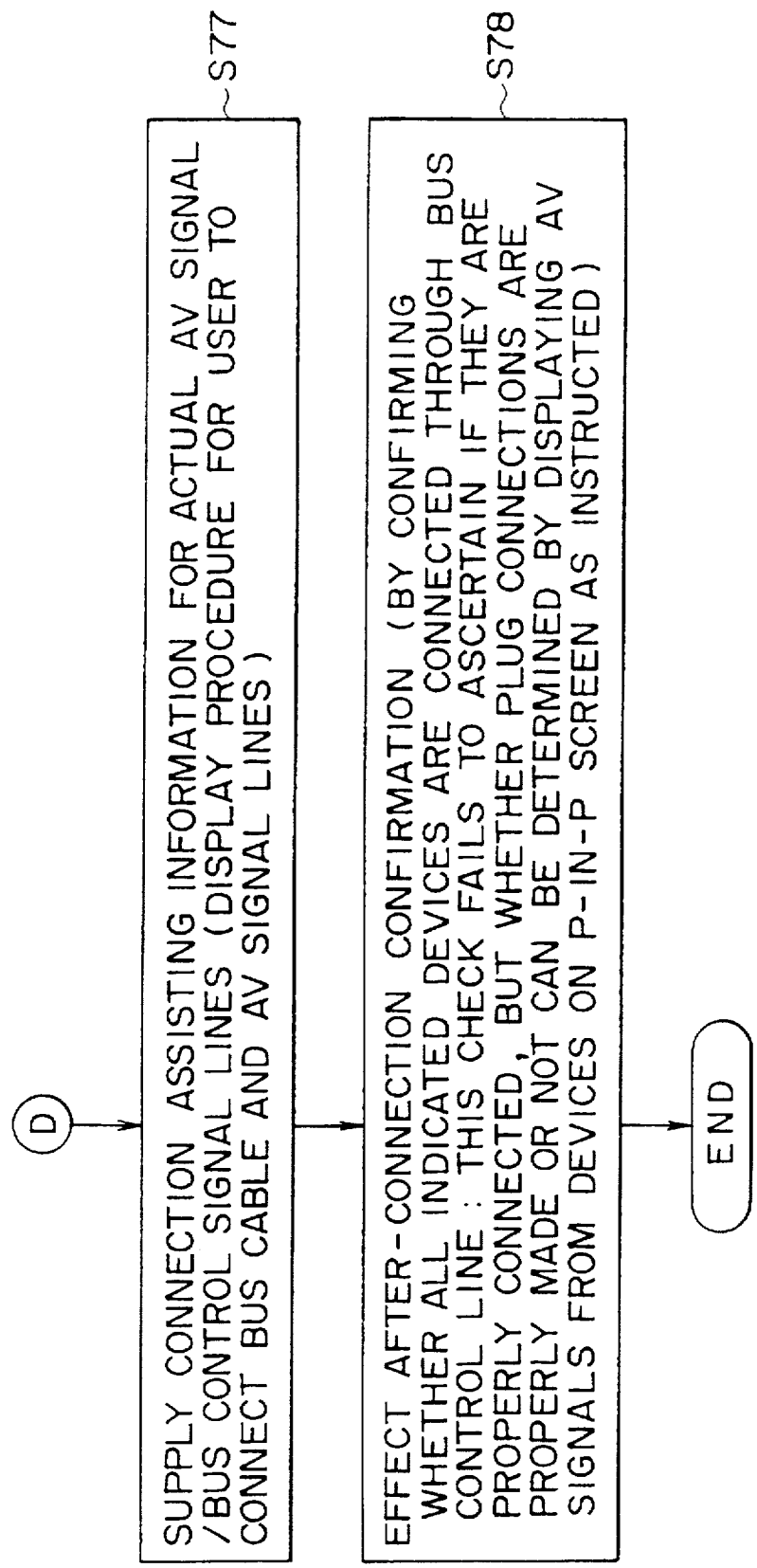

FIGS. 15 and 16 show a process of keeping selected system connection information as it is. The microcontroller 9 controls the screen display IC 14 to display a menu or message on the CRT 13 to ask the user the component devices that the user wants to be connected to the TV set 100 as the AV center, i.e., to ask the user the component devices to be connected in a first layer in a step S71. Specifically, the microcontroller 9 asks the user how many VTRs, LDPs, etc. are to be connected, asks the user if another AV center is to be connected as an auxiliary AV center, and stores the user's answers from the remote controller 12 in the memories 1, 2, . . . , Z.

Then, the microcontroller 9 selects the actual system configuration from the contents of the memories 1, 2, . . . , Z, and stores it in the memory, thus finishing the system connection setting for the first layer in a step S72.

Thereafter, the microcontroller 9 establishes a connection setting for a second layer. Specifically, the microcontroller 9 controls the screen display IC 14 to display a menu or message on the CRT 13 to ask the user the component devices that the user wants to be connected to the component devices which are connected to the AV center 100, to ask the user the component devices to be connected in a second layer in a step S73. Specifically, the microcontroller 9 asks the user how many component devices are to be connected to the component devices that are connected to the AV center 100, e.g., the first VTR and the second VTR, and which component devices are to be connected, and stores the user's answers from the remote controller 12 in the memories A1, A2, A3, A4 . . . .

Then, the microcontroller 9 determines whether a configuration setting in the auxiliary AV center has already been established or not in a step S74. If a configuration setting in the auxiliary AV center has already been established, then control jumps to a step S76. If a configuration setting in the auxiliary AV center has not been established, then control proceeds to a step S75.

In the step S75, the microcontroller 9 controls the screen display IC 14 to display a menu or message on the CRT 13 to ask the user the component devices that the user wants to be connected to the auxiliary AV center and the number of such component devices, and stores the user's answers from the remote controller 12 in the memories S1, S2, . . . . . Then, based on the contents of the memories S1, S2, . . . , the microcontroller 9 establishes a system configuration for the auxiliary AV center and transmits the system configuration information to the auxiliary AV center.

In a next step S76, the microcontroller 9 sets system configuration information based on the contents of the memories A1, A2, A3, A4, . . . . Then, the microcontroller 9 supplies actual connection assisting information for the AV signal/bus signal control lines in a step S77. Thereafter, the microcontroller 9 effects an after-connection confirmation process, i.e., confirms that all the indicated component devices have been connected through the bus, and detects and displays whether AV signals are supplied from the component devices, thus checking whether the plugs are properly connected or not, in a step S78.

If the component devices connected to the AV terminals of the component device and the numbers of their AV terminals are stored in the memory as shown in FIGS. 15 and 16, then a large memory area is required. If a non-volatile memory (NVRAM) is used to protect stored system configuration information upon a power supply failure, then the cost is considerably large.

According to the present invention, the overall connection information is controlled based on the information regarding the difference between the pointer SIP to a predetermined system configuration information and an actual system configuration, thus reducing the storage capacity of a non-volatile memory that is used.

A less non-volatile memory capacity may be sufficient if an actual system configuration can be represented by predetermined system configuration information. According to the present invention, there are required an NVRAM area for storing information indicative of whether there is difference information and an NVRAM for storing difference information itself.

To set the SIP and select the IHP, the following menus are successively displayed for the user to select system configuration information:

| VTR to be connected ? | Y/N |
|---|---|
| | If YES, how many ? 1, 2, 3 ? |
| LDP to be connected ? | Y/N |
| Audio AMP to be connected ? | Y/N |
| Video TUNER to be connected ? | Y/N |

If the AV center (TV) has many plugs, then a connection setting can be established relatively easily because no connections to a lower layer need to be considered. It will be easier for the user to understand connection settings if an actual system configuration is displayed on the display screen while a selection is being made.

For connection of component devices in a lower layer, then the above menus are used to ask the user whether there are any component devices to be connected in a lower layer after Y/N. If there is such a component device in a lower layer, then it is selected. If a component device in a lower layer is an auxiliary AV center, then it is selected in a manner similar to a menu for establishing an auxiliary AV center.

Specifically, the number of component devices to be connected to the AV center is first input by the user, and if they cannot be connected in one layer with the maximum number of plugs that the AV center has, then the user is allowed to make a selection while a system configuration in a second layer is being displayed.

Figure 17A:
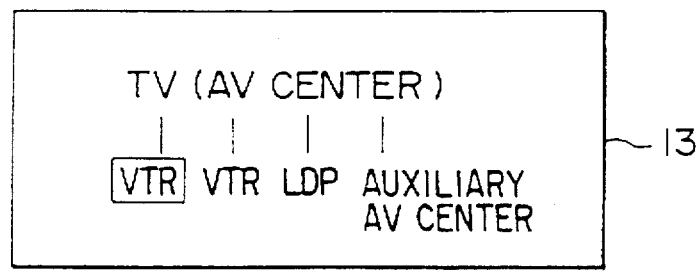
FIGS. 17(a), 17(b), and 17(c) are views showing, by way of example, displayed information for facilitating a connection setting to be made by the user.
Figure 17B:
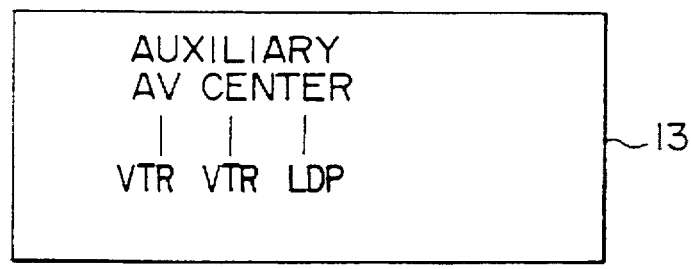
Figure 17C:
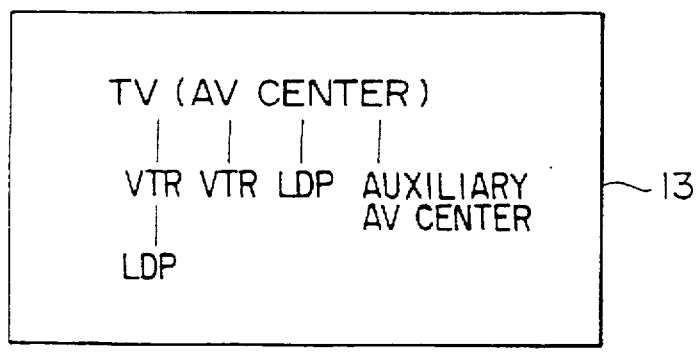

FIGS. 17(a), 17(b), and 17(c) show, by way of example, displayed information for facilitating a connection setting to be made by the user. The microcontroller for the D2B communication protocol initially displays information shown in FIG. 17(a). In FIG. 17(a), the cursor is positioned at "VTR" on the leftmost end. The microcontroller for the D2B communication protocol prompts the user to press a selection button. When the user presses the selection button, with the cursor on the leftmost end, the display switches successively to "VTR", "LDP", "AUXILIARY AV CENTER", . . . . After setting the leftmost end, the cursor is moved to "VTR" at the center, and the user presses the selection buttons to select "LDP", "AUXILIARY AV CENTER", . . . .

An auxiliary AV center may be established on the side of the auxiliary AV center, or may be established on the displayed screen shown in FIG. 17(a) and thereafter the information of the auxiliary AV center may be transmitted to the auxiliary AV center.

For establishing an auxiliary AV center on the displayed screen shown in FIG. 17(a), information for establishing an auxiliary AV center is displayed on the screen as shown in 17(b), and an auxiliary AV center is established in the same manner as described above. After the auxiliary AV center is established, established information is transferred to the auxiliary AV center. Since the system configuration information that has existed in the auxiliary AV center is rewritten by the transferred information, it is preferable to confirm whether the existing system configuration information may be rewritten or not before the established information is transferred to the auxiliary AV center.

When a setting up of a second layer is selected, the displayed information changes from FIG. 17(a) to FIG. 17(b), and a connection setting for an LDP, for example, is carried out;

Heretofore, when the main power supply which has been turned off is turned on, it has been necessary to establish a system configuration again. Therefore, it has been customary to store system configuration information in a non-volatile memory, and to restore the stored system configuration information from the non-volatile memory when the main power supply is turned on.

If the system configuration information is stored as it is, then a large amount of information needs to be stored, and hence a storage capacity for storing the same is relatively large and costly. According to the present invention, the amount of information to be stored in the non-volatile memory is reduced by using the SIP. With the SIP, the system configuration information is not stored as it is, but the pointer to the system configuration information is stored. Therefore, the storage capacity for storing necessary information is reduced.

Inasmuch as a reduced amount of information is required to be controlled, it is not necessary to employ a dedicated non-volatile memory as is the case with the conventional system, but it is sufficient to use a portion of a channel-selection non-volatile memory which is originally equipped in a TV set or the like.

Any control information which is indicative of whether such a non-volatile memory has already been set up or not and is to be set up by the user is also reduced and hence can be controlled relatively easily.

Figure 18:
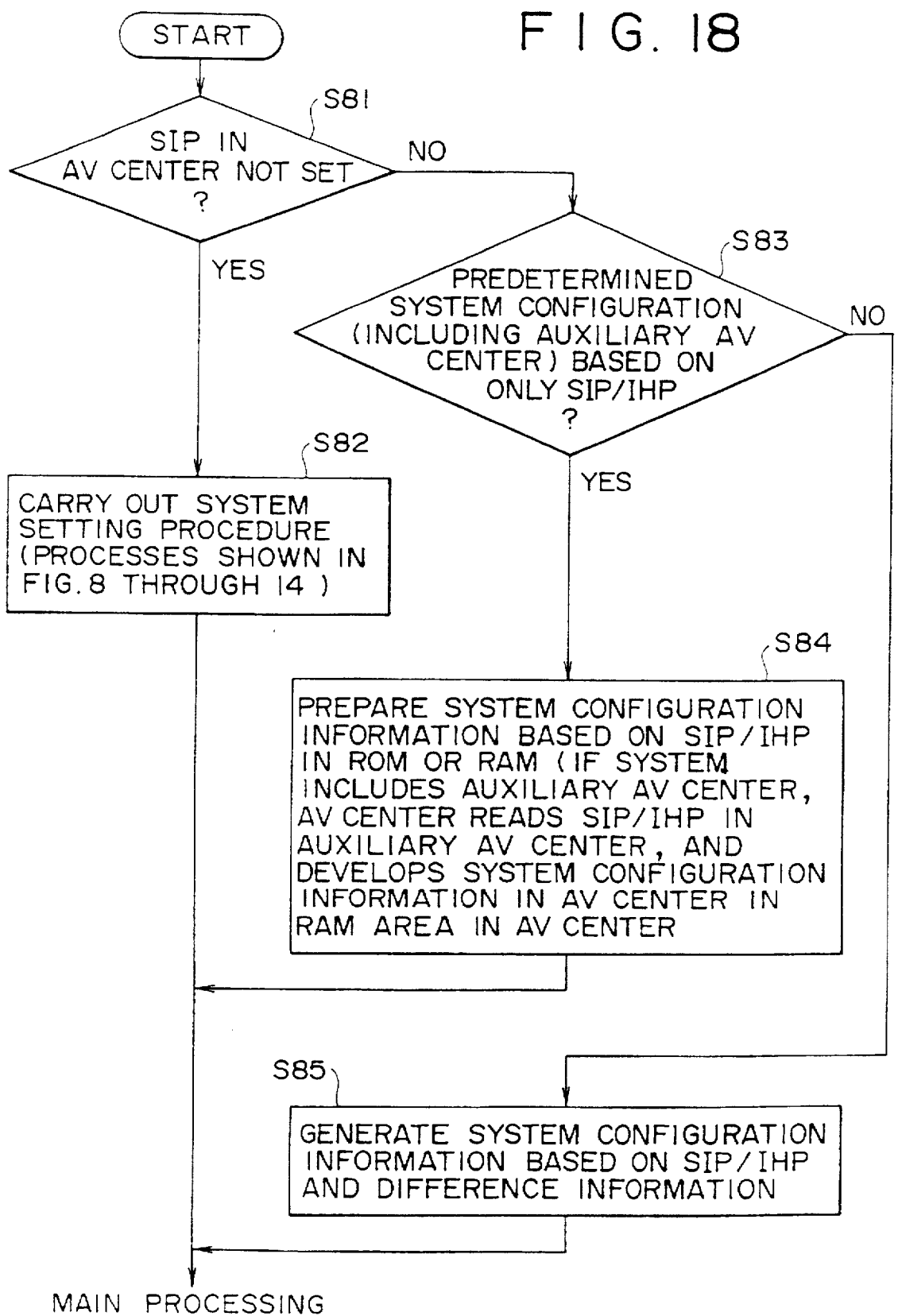

FIG. 18 shows a process of an operation sequence when the main power supply that has been turned off is turned on. If the SIP in the AV center is not established (YES in a step S81), then the microcontroller for the D2B communication protocol carries out the system setting shown in FIGS. 8 through 14 in a step S82, and enters the main processing.

If the SIP is established, the microcontroller for the D2B communication protocol determines whether it is predetermined connection information based on the SIP and the IHP in a step S83. If it is, then the microcontroller for the D2B communication protocol prepares system configuration information based on the SIP and the IHP in the RAM (if the system includes an auxiliary AV center, the microcontroller reads the SIP and the IHP from the auxiliary AV center, and develops system configuration information of the auxiliary AV center in the RAM in the AV center) in a step S84, and then enters the main processing.

If the microcontroller not predetermined connection information based on the SIP and the IHP in the step S83, then the microcontroller for the D2B communication protocol generates system configuration information based on the predetermined connection information based on the SIP and the IHP and the system configuration requested by the user in a step S85, and thereafter enters the main processing.

Use of the SIP and the IHP will be described below. The IHP is used to achieve an actual system configuration while reducing definitions of the SIP. For example, any definitions of the SIP at numbers lower than the position of 100 become unnecessary by using combinations of numbers higher than the position of 100 and the IHP.

When combinations of the SIP and IHP are used, a setting up of a system configuration with fewer plugs than a default SIP pattern may be replaced with an SIP +IHP combination representing a larger system configuration. Therefore, a ROM data table for storing predetermined system configuration information may be relatively small though an NVRAM area is required for storing the IHP. The IHP is of 1 byte capable of monitoring the turning on and off of 8 plugs. Four bytes are required by the SIP and the IHP of an AV center and an auxiliary AV center. If the total number of plugs of an AV center and an auxiliary AV center is up to 8, then 3 bytes may be enough for the SIP and the IHP.

For example, variations using SIP No. 9: TV (four plugs) /VTR1 (P1)/VTR2 (P2)/VTR3 (P3)/LDP (P4) and the IHP are shown in FIG. 19.

A system of a more complex system configuration can be handled with relatively simple control process and control data by distributing the burden between an auxiliary AV center and an AV center, as described below.

It is assumed that the address of an AV center is fixed to only one address 1C8H and the address of one auxiliary AV center is defined as 1C9H, the addresses of two auxiliary AV centers as 1C9H and 1CAH, and the addresses of three auxiliary AV centers as 1C9H, 1CAH, and 1CBH. The auxiliary AV center only supports up to those layers of component devices that are directly connected to the auxiliary AV center. The auxiliary AV center stores a system configuration up to the layers directly connected thereto specifically with SIP/IHP values.

The connection is set up by the auxiliary AV center itself. The AV center may set up connection information in the auxiliary AV center. In such a case, the established information in the auxiliary AV center may be transmitted from the AV center and stored in the auxiliary AV center.

Switching between an AV center and an auxiliary AV center will be described below. That a TV set or the like does not use a component device address 100H but becomes an AV center having an address 1C8H is defined as follows: Any component device which can become an AV center has a function capable of establishing that it uses its own component device address (TV=100H, . . . , 107H) or it defines itself as an AV center (address 1C8H). When a TV set is defined as an AV center by the user, system configuration information has to be established in the TV set (AV center).

When a TV set is defined as an AV center, if an AV center is already in the system, i.e., if an AV amplifier is established as an AV center with bus signal lines connected, then a warning is displayed on the screen of the TV set to be defined as an AV center. After the user has confirmed the displayed warning, the TV set is established as the AV center. At this time, the AV center that has existed so far becomes an auxiliary AV center, and it is confirmed whether the component devices connected to the auxiliary AV center are connected in a first layer, i.e., directly connected, or not by checking the SIP/IHP. Specifically, the new AV center sends a command indicating that the existing AV center will become an auxiliary AV center to a component device whose address is 1C8H, i.e., an AV amplifier, and thereafter changes its own address to 1C8H.

The component device which has previously been the AV center is commanded to become an auxiliary AV center and confirms whether an address 1C9H has already been used. If it has not been used, the address is used as the address of the auxiliary AV center (e.g., an AV amplifier). If it has already used, the address is reset to a higher address 1CAH, and confirms whether the address 1CAH has already been used or not. The address is incremented by +1 from 1C9H up to a maximum address 1CFH so that seven AV centers can be defined on the system.

Figure 20:
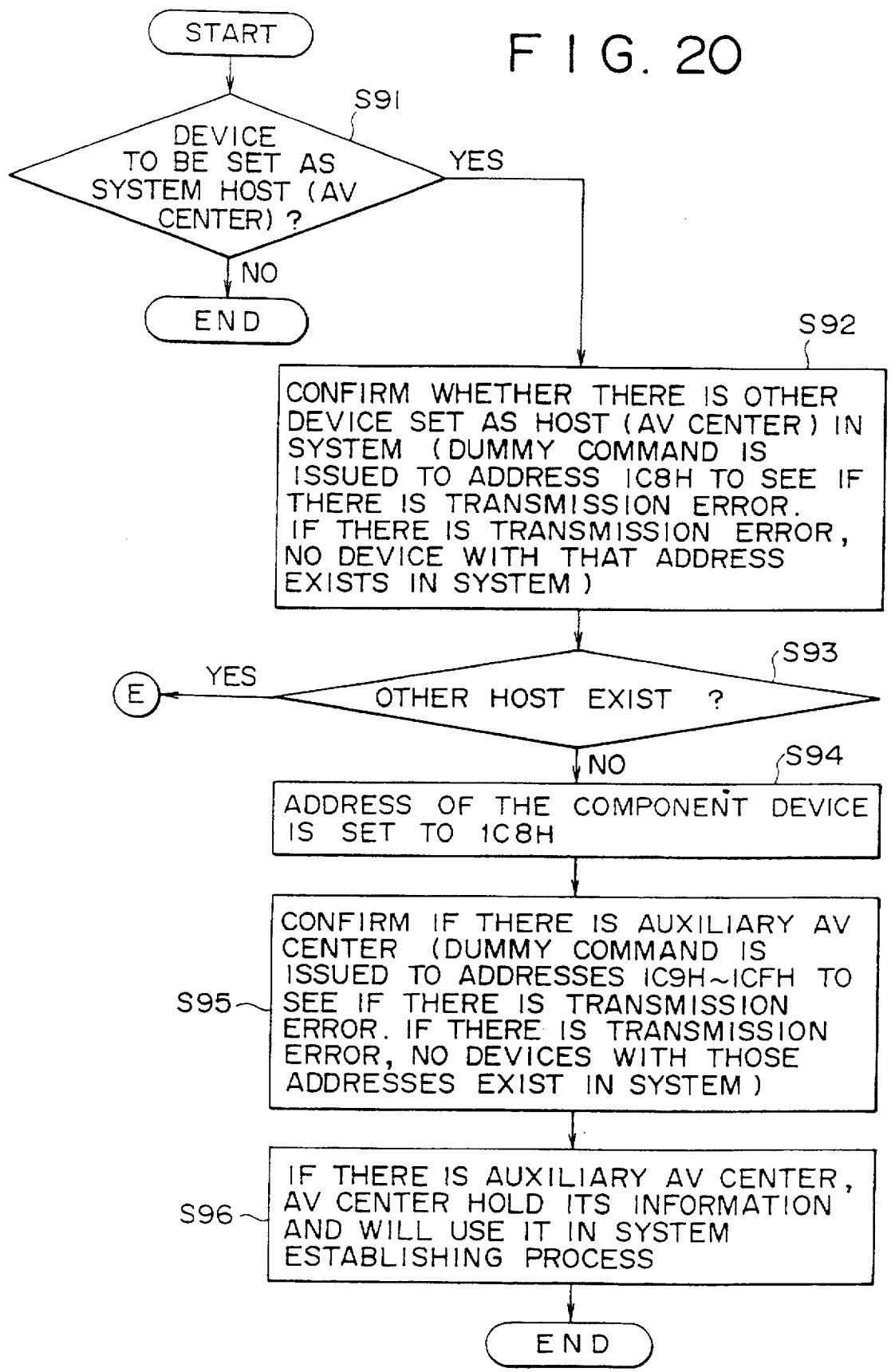
FIGS. 20 and 21 are flowcharts of another process of establishing an AV center.
Figure 21:
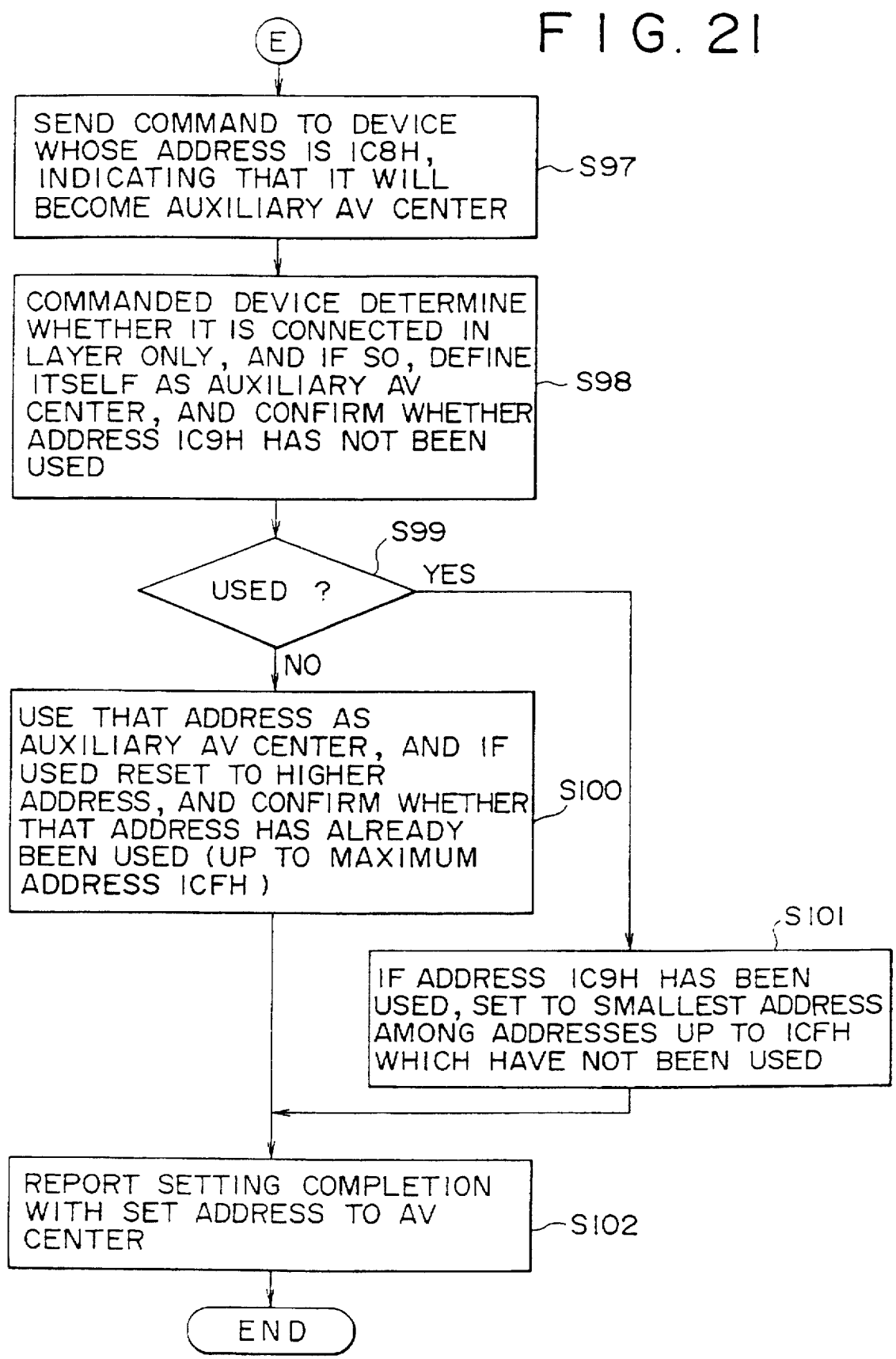

FIGS. 20 and 21 are another process of establishing an AV center. The microcontroller for the D2B communication protocol in a certain component device displays a menu or message to ask the user if the component device is to be established as a host, i.e., an AV center, of the system in a step S91. If the component device is not to be established as an AV center, then control ends.

If the component device is to be established as an AV center in the step S91, the microcontroller for the D2B communication protocol confirms whether there is another component device established as an AV center in the system in a step S92. Specifically, the microcontroller for the D2B communication protocol sends a dummy command to an address 1C8H (which is the address of an AV center). If a transmission error occurs, then it can be found that there is no other AV center in the system.

If there is no other host or AV center (YES in a step S93), then the microcontroller for the D2B communication protocol sets the address of the component device to 1C8H to establish the component device as an AV center in a step S94. Then, the microcontroller for the D2B communication protocol confirms whether there has been established another auxiliary AV center in a step S95. If another auxiliary AV center exists, then the microcontroller for the D2B communication protocol in the AV center, i.e., the component device, holds the information indicating that another auxiliary AV center exists, and will use if in a system establishing process in a step S96.

If there is another host or AV center in the step S93, then the microcontroller for the D2B communication protocol transmits a command to another AV center whose address is 1C8H, indicating that the other AV center will become an auxiliary AV center (component device whose address is 1C9H) in a step S97.

The microcontroller for the D2B communication protocol in the commanded component device determines whether it is connected up to a first layer or not. If connected, then it is defined as an auxiliary AV center, and confirms whether the address 1C9H has been used or not in a step S98. If it is not used (NO in a step S99), then the address is used as the address of the auxiliary AV center in a step S100. If it is used (YES in the step S99), then the smallest address not used among the addresses up to 1CFH is used as the address of the auxiliary AV center in a step S101. Then, the completion of the setting of the auxiliary AV center, together with the set address information, is reported to the AV center in a step S102.

A process of establishing a system configuration (partly automatically) will be described below. If the use has one TV set and two VTRs and inputs TV/VTR(2) on the initial system setting screen, the microcontroller for the D2B communication protocol in the AV center selects SIP No.= 106, and confirms whether an auxiliary AV center is connected or not by issuing a dummy command to the addresses 1C9H, 1CAH, . . . , 1CFH. If an auxiliary AV center is connected, then the D2B communication protocol in the AV center sets a mask bit at the flag of the auxiliary AV center in the IHP.

If the microcontroller for the D2B communication protocol in the AV center selects SIP No. =109, then a component device which is not actually connected is assigned. Based on the SIP, the microcontroller for the D2B communication protocol issues a certain command (which may be an inquiry command) to various component devices. If a component device is not connected, a transmission error occurs, indicating that the device does not exist.

Then, the microcontroller for the D2B communication protocol in the AV center issues a dummy command to the addresses 1C9H, 1CAH, . . . , 1CFH to confirm whether an auxiliary AV center is connected. If the connection of an auxiliary AV center is confirmed, then the microcontroller for the D2B communication protocol sets a mask bit at the flag of the auxiliary AV center in the IHP in the AV center.

The SIP No. is not changed, and information regarding component devices not used is stored in the memory. The system connection is controlled based on the SIP No. and the non-connection information. It is practical to represent the non-connection information with 1 byte because 2 bytes composed of the SIP No. and the non-connection information allow use of a non-volatile memory for storing channel information.

If it is 1 byte and can be simply handled, then use and non-use of 8 plugs can be controlled. Specifically, if the AV center has up to 8 plugs, then the 1 byte may be used to inhibit the use of certain plugs of a plug arrangement of the AV center which is specified by the SIP even when the SIP is selected to be slightly large.

The system may be checked with an OSD menu after the SIP No. has been set, or may be checked by checking whether each component is actually connected to the bus when the SIP is selected. However, it is impossible to check whether AV signal lines are correctly connected to the plugs. Such a connection check may be carried out by checking a video signal from a playback device using PinP.

FIGS. 22 through 25 show, by way of example, designated SIP numbers.

FIGS. 26 through 31 show specific AV system configurations, by way of example.

FIGS. 32 through 35 show, by way of example, other designated SIP numbers.

The illustrated embodiments are directed to an AV equipment system. However, the principles of the present invention are also applicable to various systems including communication systems on transportation apparatus, e.g., airplanes, automobiles, trains, ships, and buses, systems composed of a personal computer and AV component devices, and systems for controlling remove devices with a modem through a telephone line or radio communications.

Although certain preferred embodiments of the present invention have been shown and described in detail, it should be understood that various changes and modifications may be made therein without departing from the scope of the appended claims.

What is claimed is:

1. A hierarchical audio video equipment system having at least two control levels and an external bus line, comprising:

main control means connected to an internal bus for controlling an operation of a first level of the audio video equipment system;

auxiliary control means connected to the internal bus for controlling an operation of a second level of an external system through the external bus line controlled by said main control means;

memory means connected to the internal bus for storing a program to control said main control means and/or said auxiliary control means;

display means connected to the internal bus for displaying a status of the audio video equipment system and/or command applied by a user;

selector means connected to the internal bus for selecting an audio signal and/or a video signal supplied from a device of said external system;

clock means connected to the internal bus for generating a clock signal to synchronize the operation of said main control means and/or said auxiliary control means;

system configuration memory means connected to the internal bus for storing a plurality of predetermined system configurations of the audio video equipment system and;

difference information memory means connected to the internal bus for storing difference information indicative of a difference from the plurality of predetermined system configurations stored in said system configuration memory means whereby a user can select any system configuration supported by information stored in either said system configuration memory means or said difference information memory means.

2. An audio video equipment system according to claim 1, further comprising:

system information pointer memory means connected to the internal bus for storing a plurality of pieces of pointer information indicating the respective plurality of predetermined system configurations stored in said system configuration memory means.

3. An audio video equipment system according to claim 1, further comprising:

inhibit plug memory means connected to the internal bus for storing inhibit plug information with the plurality of predetermined system configurations stored in said system configuration memory means.

4. A method of establishing a connection setting of audio video system having at least two control levels, comprising the steps of:

establishing predetermined connection settings of the audio video system;

inquiring of a user of the system what devices of the audio video system are to be connected directly to a main device at a first level;

inquiring of the user how many devices are to be connected directly to the main device;

inquiring of the user whether an auxiliary control device is to be connected to the main device for controlling devices at a second level;

inquiring of the user what devices are to be connected to the auxiliary control device if the auxiliary control device is to be connected to the main device;

inquiring of the user how many devices are to be connected to the auxiliary control device if the auxiliary control device is to be connected to the main device; and using the information provided by the user to establish a connection setting of the system in terms of deviations of the information from said predetermined connection settings.

5. A method according to claims 4, further comprising the steps of:

checking whether a system configuration set by the user is equal to one of a plurality of predetermined system configurations stored in a system configuration memory; and connecting a signal line and displaying confirming information on a display unit if the system configuration set by the user is equal to one of the plurality of predetermined system configurations.

6. A method according to claim 5, further comprising the steps of:

checking whether difference information exists in a difference information memory if the system configuration set by the user is not equal to one of the plurality of predetermined system configurations; and correcting data in said system configuration memory with data stored in the difference information memory if the difference information exists in the difference information memory.

7. A method according to claim 6, further comprising the step of:

displaying a system setting disability and allowing the user to enter a system configuration again if the difference information does not exist in the difference information memory.

8. A method according to claim 6, further comprising the step of:

using a system configuration pointer stored in a system configuration pointer memory rather than one of the plurality of system configurations stored in said system configuration memory after checking whether difference information exists in the different information memory.

9. A method according to claims 5, further comprising the step of:

using a system configuration pointer stored in a system configuration pointer memory in place of one of the plurality of predetermined system configurations stored in said system configuration memory after checking whether a system configuration set by the user is equal to one of the plurality of predetermined system configurations stored in a system configuration memory.

10. A method according to claim 5, further comprising the step of:

checking whether inhibit plug information exists in an inhibit plug information memory if the system configuration set by the user is not equal to one of the plurality of predetermined system configurations; and correcting data in said system configuration memory with data stored in the inhibit plug information memory if the inhibit plug information exists in said inhibit plug information memory.

11. A method according to claim 10, further comprising the step of:

displaying a system setting disability and allowing the user to enter a system configuration again if the inhibit plug information does not exist in said inhibit plug information memory.

12. A method according to claim 10, further comprising the step of:

using a system configuration pointer stored in a system configuration pointer memory rather than one of the plurality of predetermined system configurations stored in said system configuration memory after checking whether inhibit plug information exists in the inhibit plug memory.

13. A method of establishing a connection setting of an audio video system to determine a master device, comprising:

checking, with a predetermined device, whether another device has been set as a master device if the user of the system wants to set the predetermined device as a master device; and establishing a connection based on the outcome of said checking;

wherein said checking step is carried out by sending a dummy command to a predetermined address reserved for a master device;

determining whether or not there is another device having said predetermined address, and, if not, assigning said predetermined address to said predetermined device.

14. A method according to claim 13, further comprising the steps of:

checking whether there is an auxiliary master device if there is another device set as a master device; and instructing a previous master device to become an auxiliary master device if there is no other device set as a master device.

15. A method according to claim 13, further comprising the steps of:

waiting for system configuration information input by the user of the system if there is no other device set as a master device;

generating system configuration information, difference information, and/or inhibit plug information based on said system configuration information input by the user;

setting a predetermined address as the address of the master device;

confirming that there is an auxiliary master device; and correcting said system configuration information with information from said auxiliary master device.

16. A method according to claim 15, further comprising the steps of:

storing the determined final system configuration in a non-volatile memory after determining final system configuration information.

17. A method according to claim 13, wherein said predetermined address is represented by 1C8 in hexagonal code.

18. A method according to claim 13, wherein said predetermined address is represented by one of 1C8 through 1CF in hexagonal code.

* * * * *